United States Patent
Herz et al.

(10) Patent No.: US 9,955,426 B2
(45) Date of Patent: *Apr. 24, 2018

(54) BACKLIGHT AND AMBIENT LIGHT SENSOR SYSTEM

(75) Inventors: Scott M. Herz, Santa Clara, CA (US); Roberto G. Yepez, San Francisco, CA (US); Michael F. Culbert, Monte Sereno, CA (US); Scott Forstall, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 719 days.

This patent is subject to a terminal disclaimer.

(21) Appl. No.: 13/227,989

(22) Filed: Sep. 8, 2011

(65) Prior Publication Data

US 2012/0001960 A1    Jan. 5, 2012

Related U.S. Application Data

(63) Continuation of application No. 11/650,014, filed on Jan. 5, 2007, now Pat. No. 8,031,164.

(51) Int. Cl.
*G06F 1/32* (2006.01)
*H04W 52/02* (2009.01)
(Continued)

(52) U.S. Cl.
CPC ...... *H04W 52/0254* (2013.01); *G06F 1/3203* (2013.01); *G06F 1/3265* (2013.01);
(Continued)

(58) Field of Classification Search
CPC ......... G09G 3/3607; G09G 2320/0626; G09G 2320/0606; G09G 2360/144;
(Continued)

(56) References Cited

U.S. PATENT DOCUMENTS

| 4,684,294 A | 8/1987 | O'Neill |
| 5,095,945 A | 3/1992 | Jensen et al. |

(Continued)

FOREIGN PATENT DOCUMENTS

| CN | 1581052 | 2/2005 |
| CN | 1828711 | 9/2006 |

(Continued)

OTHER PUBLICATIONS

PCT Search Report dated Aug. 21, 2008; PCT/US2007/026130.

(Continued)

*Primary Examiner* — William Boddie
*Assistant Examiner* — Saifeldin Elnafia
(74) *Attorney, Agent, or Firm* — Womble Bond Dickinson (US) LLP

(57) ABSTRACT

Apparatuses and methods to operate a display device of an electronic device. In some embodiments, a method includes receiving a user setting of a display control parameter, and altering, based on the user setting, an effect of an ambient light sensor value (ALS) on control of the display control parameter. Also, according to embodiments of the inventions, a method of operating a display of an electronic device includes receiving a change to one of a display brightness output level and an ambient light sensor output level, and altering, according to the change, a display contrast output level. In some embodiments, a method of operating a proximity sensor of an electronic device includes receiving a light sensor output, and altering, according to the output, an on/off setting of a proximity sensor. Other apparatuses and methods and data processing systems and machine readable media are also described.

25 Claims, 15 Drawing Sheets

(51) Int. Cl.
    *G09G 3/36*     (2006.01)
    *H04M 1/22*     (2006.01)

(52) U.S. Cl.
    CPC ... *G09G 3/3607* (2013.01); *G09G 2320/0606* (2013.01); *G09G 2320/066* (2013.01); *G09G 2320/0626* (2013.01); *G09G 2360/144* (2013.01); *H04M 1/22* (2013.01); *H04M 2250/12* (2013.01); *Y02B 60/1242* (2013.01); *Y02B 60/50* (2013.01)

(58) Field of Classification Search
    CPC ............ G09G 2320/066; G06F 1/3203; G06F 1/3265; H04W 52/0254; Y02B 60/50; Y02B 60/1242; H04M 2250/12; H04M 1/22
    USPC .................................. 345/87, 102, 204, 207
    See application file for complete search history.

(56) References Cited

U.S. PATENT DOCUMENTS

| | | | |
|---|---|---|---|
| 5,103,085 | A | 4/1992 | Zimmerman |
| 5,270,818 | A | 12/1993 | Ottenstein |
| 5,406,305 | A | 4/1995 | Shimomura et al. |
| 5,528,266 | A | 6/1996 | Arbeitman et al. |
| 5,684,294 | A | 11/1997 | Kouhi |
| 5,786,801 | A * | 7/1998 | Ichise ................. 345/102 |
| 5,884,156 | A | 3/1999 | Gordon |
| 5,894,298 | A | 4/1999 | Hoeksma |
| 5,952,992 | A | 9/1999 | Helms |
| 6,018,674 | A | 1/2000 | Aronow |
| 6,208,854 | B1 | 3/2001 | Roberts et al. |
| 6,246,862 | B1 | 6/2001 | Grivas et al. |
| 6,289,453 | B1 | 9/2001 | Walker et al. |
| 6,373,612 | B1 | 4/2002 | Hoffman et al. |
| 6,477,374 | B1 | 11/2002 | Shaffer et al. |
| 6,520,013 | B1 | 2/2003 | Wehrenberg |
| 6,522,697 | B1 | 2/2003 | Spickermann |
| 6,583,676 | B2 | 6/2003 | Krah et al. |
| 6,601,012 | B1 | 7/2003 | Horvitz et al. |
| 6,664,744 | B2 | 12/2003 | Dietz |
| 6,724,994 | B1 | 4/2004 | Collings et al. |
| 6,803,920 | B2 | 10/2004 | Gossett et al. |
| 6,812,466 | B2 | 11/2004 | O'Connor et al. |
| 6,822,635 | B2 | 11/2004 | Shahoian et al. |
| 6,947,017 | B1 | 9/2005 | Gettemy |
| 6,947,571 | B1 | 9/2005 | Rhoads et al. |
| 6,956,564 | B1 | 10/2005 | Williams |
| 7,016,705 | B2 | 3/2006 | Bahl et al. |
| 7,019,622 | B2 | 3/2006 | Orr et al. |
| 7,117,021 | B2 | 10/2006 | Shearer et al. |
| 7,117,380 | B2 | 10/2006 | Kangas |
| 7,171,221 | B1 | 1/2007 | Amin et al. |
| 7,177,664 | B2 | 2/2007 | Weinzweig et al. |
| 7,209,719 | B2 | 4/2007 | Liebenow |
| 7,268,775 | B1 * | 9/2007 | Gettemy ................. 345/204 |
| 7,522,065 | B2 | 4/2009 | Falcon |
| 7,605,693 | B2 | 10/2009 | Kulas |
| 7,633,076 | B2 | 12/2009 | Huppi et al. |
| 2001/0031633 | A1 | 10/2001 | Tuomela et al. |
| 2001/0031645 | A1 | 10/2001 | Jarrett |
| 2002/0018050 | A1 | 2/2002 | Turner |
| 2002/0019249 | A1 | 2/2002 | Kashu et al. |
| 2002/0065099 | A1 | 5/2002 | Bjorndahl |
| 2002/0167488 | A1 | 11/2002 | Hinckley et al. |
| 2003/0022666 | A1 | 1/2003 | Sato |
| 2003/0022671 | A1 | 1/2003 | Huomo et al. |
| 2003/0095096 | A1 | 5/2003 | Robbin et al. |
| 2003/0108300 | A1 | 6/2003 | Walker et al. |
| 2003/0224726 | A1 | 12/2003 | Shearer et al. |
| 2004/0012556 | A1 | 1/2004 | Yong et al. |
| 2004/0063452 | A1 | 4/2004 | Tomoda |
| 2004/0110472 | A1 | 6/2004 | Witkowski et al. |
| 2004/0180649 | A1 | 9/2004 | Vogel et al. |
| 2004/0203351 | A1 | 10/2004 | Shearer et al. |
| 2004/0213576 | A1 | 10/2004 | Tan et al. |
| 2004/0224638 | A1 | 11/2004 | Fadell et al. |
| 2004/0233153 | A1 | 11/2004 | Robinson |
| 2004/0245438 | A1 | 12/2004 | Payne et al. |
| 2005/0057169 | A1 | 3/2005 | Noguchi et al. |
| 2005/0104908 | A1 * | 5/2005 | Brown Elliott ............... 345/694 |
| 2005/0132416 | A1 | 6/2005 | Wasilewski |
| 2005/0143057 | A1 | 6/2005 | Shiraga et al. |
| 2005/0168658 | A1 | 8/2005 | Woolgar et al. |
| 2005/0171662 | A1 | 8/2005 | Strege et al. |
| 2005/0190142 | A1 | 9/2005 | Ferguson |
| 2005/0219223 | A1 | 10/2005 | Kotzin et al. |
| 2005/0219228 | A1 | 10/2005 | Alameh et al. |
| 2005/0219394 | A1 | 10/2005 | Du et al. |
| 2005/0221791 | A1 | 10/2005 | Angelhag |
| 2005/0253817 | A1 | 11/2005 | Rytivaara et al. |
| 2006/0007107 | A1 * | 1/2006 | Ferguson ..................... 345/102 |
| 2006/0017692 | A1 | 1/2006 | Wehrenberg et al. |
| 2006/0026521 | A1 | 2/2006 | Hotelling et al. |
| 2006/0026535 | A1 | 2/2006 | Hotelling et al. |
| 2006/0052141 | A1 | 3/2006 | Suzuki |
| 2006/0060762 | A1 | 3/2006 | Chan et al. |
| 2006/0081771 | A1 | 4/2006 | Eliad Wardimon |
| 2006/0082057 | A1 | 4/2006 | Luciano et al. |
| 2006/0087245 | A1 | 4/2006 | Ng et al. |
| 2006/0097991 | A1 | 5/2006 | Hotelling et al. |
| 2006/0116175 | A1 | 6/2006 | Chu |
| 2006/0146012 | A1 | 7/2006 | Arneson et al. |
| 2006/0161870 | A1 | 7/2006 | Hotelling et al. |
| 2006/0161871 | A1 | 7/2006 | Hotelling et al. |
| 2006/0164241 | A1 | 7/2006 | Makela et al. |
| 2006/0166702 | A1 | 7/2006 | Dietz et al. |
| 2006/0197753 | A1 | 9/2006 | Hotelling |
| 2006/0199536 | A1 | 9/2006 | Eisenbach |
| 2006/0229101 | A1 | 10/2006 | LaBauve et al. |
| 2006/0252470 | A1 | 11/2006 | Seshadri et al. |
| 2006/0117108 | A1 | 12/2006 | Salisbury et al. |
| 2006/0290921 | A1 | 12/2006 | Hotelling |
| 2006/0291863 | A1 | 12/2006 | Chan et al. |
| 2007/0003289 | A1 | 1/2007 | Tan et al. |
| 2007/0004473 | A1 | 1/2007 | Clark et al. |
| 2007/0042714 | A1 | 2/2007 | Ayed |
| 2007/0046629 | A1 | 3/2007 | Chi-Boon et al. |
| 2007/0057773 | A1 | 3/2007 | Hsieh et al. |
| 2007/0065134 | A1 | 3/2007 | Sugimoto |
| 2007/0075965 | A1 | 4/2007 | Huppi et al. |
| 2007/0085157 | A1 | 4/2007 | Fadell et al. |
| 2007/0088812 | A1 | 4/2007 | Clark |
| 2007/0099574 | A1 | 5/2007 | Wang |
| 2007/0123171 | A1 | 5/2007 | Slamka et al. |
| 2007/0123287 | A1 | 5/2007 | Mock et al. |
| 2007/0135091 | A1 | 6/2007 | Wassingbo |
| 2007/0135151 | A1 | 6/2007 | Dendy |
| 2007/0138493 | A1 | 6/2007 | Morimoto et al. |
| 2007/0161410 | A1 | 7/2007 | Huang et al. |
| 2007/0225047 | A1 | 9/2007 | Bakos |
| 2007/0233759 | A1 | 10/2007 | Tomlinson et al. |
| 2007/0239903 | A1 | 10/2007 | Bhardwaj et al. |
| 2007/0266185 | A1 | 11/2007 | Goddi et al. |
| 2007/0293188 | A1 | 12/2007 | Houghton et al. |
| 2008/0006762 | A1 | 1/2008 | Fadell et al. |
| 2008/0031206 | A1 | 2/2008 | Sharma |
| 2008/0090537 | A1 | 4/2008 | Sutardja |
| 2008/0090617 | A1 | 4/2008 | Sutardja |
| 2008/0102882 | A1 | 5/2008 | Sutardja |
| 2008/0113618 | A1 | 5/2008 | De Leon et al. |
| 2008/0192129 | A1 | 8/2008 | Walker et al. |
| 2009/0047904 | A1 | 2/2009 | Preston et al. |
| 2009/0098865 | A1 | 4/2009 | Vaghi et al. |
| 2009/0244092 | A1 | 10/2009 | Hotelling |
| 2009/0313473 | A1 | 12/2009 | Walker et al. |
| 2010/0105391 | A1 | 4/2010 | Bennett et al. |

FOREIGN PATENT DOCUMENTS

| | | |
|---|---|---|
| EP | 0992969 | 4/2000 |
| EP | 1185058 | 3/2002 |
| EP | 1335430 | 8/2003 |

(56) References Cited

FOREIGN PATENT DOCUMENTS

| EP | 1355223 | 10/2003 |
|---|---|---|
| EP | 1 445 922 A1 | 8/2004 |
| EP | 1452988 | 9/2004 |
| EP | 1465462 | 10/2004 |
| EP | 1507132 | 2/2005 |
| EP | 1507196 | 2/2005 |
| EP | 1650938 | 4/2006 |
| EP | 1667103 | 6/2006 |
| EP | 1696414 | 8/2006 |
| GB | 2346500 | 8/2000 |
| GB | 2418808 | 4/2006 |
| JP | 05-323277 | 12/1993 |
| JP | 9146073 | 6/1997 |
| JP | 2001244498 | 9/2001 |
| JP | 2001-352395 | 12/2001 |
| JP | 2003-204390 | 7/2003 |
| JP | 2004-021476 | 1/2004 |
| JP | 2004159028 | 6/2004 |
| JP | 2004357193 | 12/2004 |
| JP | 2005-260996 | 9/2005 |
| JP | 2005-278043 | 10/2005 |
| JP | 2007-163872 | 6/2007 |
| WO | WO 00/79766 A1 | 12/2000 |
| WO | WO-2004055769 | 7/2004 |
| WO | WO-2004/093045 | 10/2004 |
| WO | WO-2005/071759 | 4/2005 |
| WO | WO-2005/101176 | 10/2005 |
| WO | WO 2005/114369 A2 | 12/2005 |

OTHER PUBLICATIONS

Non Final Office Action dated Mar. 22, 2010; U.S. Appl. No. 11/634,251.
Supplemental European Search Report dated Apr. 21, 2011 or EP Appln No. 07863192.6.
IrDA Physical Layer Implementation for Hewlett Packards Infrared Products.
"Apple Inc.", International Preliminary Report on Patentability dated May 28, 2009; PCT Applicaiotn No. PCT/US2007/023124.
"Apple Inc.", International Preliminary Report on Patentability dated May 7, 2009; PCT Application No. PCT/US2007/022335.
"Apple Inc.", International Preliminary Report on Patentability dated Jul. 16, 2009; PCT Application No. PCT/US2007/026164.
"Apple Inc.", International Preliminary Report on Patentability dated Jul. 16, 2009; PCT Application No. PCT/US2007/026141.
"Proximity Sensor Demo Kit User Guide, Version 0.62-Preliminary", *Integration Associates Inc.*; 2004 17 pages.
Agilent Technologies Inc., "Agilent unveils optical proximity sensor for mobile appliances", http:/www.embeddedstar.com/press/content/2004/8/embedded16015.html, (Aug. 31, 2004), 2 pages.
Apple, Non Final Rejection dated Jun. 9, 2009. U.S. Appl. No. 11/600,344.
Apple, Non Final Rejection dated Jun. 12, 2009; U.S. Appl. No. 11/650,117.
Apple, Non Final Rejection dated Jun. 26, 2009; U.S. Appl. No. 11/620,702.
Apple Inc., Non Final Office Action dated Mar. 3, 2010; U.S. Appl. No. 11/620,702.
Apple Inc., Final Office Action dated Nov. 9, 2009; U.S. Appl. No. 11/620 702.
Apple Inc., Non Final Office Action dated May 18, 2010; U.S. Appl. No. 11/871,725.
Apple Inc., Non Final Office Action dated May 24, 2010; U.S. Appl. No. 11/650,014.
Apple Inc., Non Final Office Actin dated Oct. 27, 2010 for U.S. Appl. No. 11/871,725.
Apple Inc., Final Rejection dated Nov. 15, 2010; U.S. Appl. No. 11/650,014.
Apple Inc., Non Final Rejection dated Nov. 15, 2010: U.S. Appl. No. 11/770,614.
Apple Inc., Non Final Office Action dated Sep. 29, 2009; U.S. Appl. No. 11/638,251.
Apple Inc., PCT Search Report dated Jun. 3, 2008; PCT/US2007/026164.
Apple Inc., Office Action dated Aug. 1, 2008; U.S. Appl. No. 11/650,117.
Apple Inc., Office Action dated Jul. 24, 2008; U.S. Appl. No. 11/600,344.
Apple Inc., International Preliminary Report on Patentability dated Jul. 16, 2009; PCT Application No. PCT/US2007/026130.
Apple Inc., "PCT Notification of Transmittal of the International Search Report and the Written Opinion of the International Searching Authority", PCT/US2007/022335, (Feb. 18, 2008).
Apple Inc., "PCT Search Report and Written Opinion dated Jul. 3, 2008", PCT/US2007/023124, 14 pages.
CNET news.com, "Reinventing the Scroll Wheel", Photo 1, http://news.com/2300-1041_3-6107951-1.html?tag=ne.gall.pg, (Aug. 22, 2006), 2 pages.
CNET news.com, "Reinventing the Scroll Wheel", Photo 2, http://news.com/2300-1041_3-6107951-2.html?tag=ne.gall.pg, (Aug. 22, 2006), 2 pages.
CNET news.com, "Reinventing the Scroll Wheel", Photo 3, http://news.com/2300-1041_3-6107951-3.html?ne.gall.pg, (Aug. 22, 2006), 2 pages.
CNET news.com, "Reinventing the Scroll Wheel", Photo 4, http://news.com/2300-1041_3-6107951-4.html?tag=ne.gall.pg, (Aug. 22, 2006), 2 pages.
CNET news.com, "Reinventing the Scroll Wheel", Photo 5, http://news.com/2300-1041_3-6107951-5.html?tag=ne.gall.pg, (Aug. 22, 2006), 2 pages.
CNET news.com, "Reinventing the Scroll Wheel", Photo 6, http://news.com/2300-1041_3-6107951-6.html?tag=ne.gall.pg, (Aug. 22, 2006), 2 pages.
CNET news.com, "Reinventing the Scroll Wheel", Photo 7, http://news.com/2300-1041_3-6107951-7.html?tag=ne.gall.pg, (Aug. 22, 2006), 2 pages.
CNET news.com, "Reinventing the Scroll Wheel", Photo 8, http://news.com/2300-1041_3-6107951-8.html?tag=ne.gall.pg, (Aug. 22, 2006), 2 pages.
Intel Corp., Non final Office Action dated Mar. 4, 2011; U.S. Appl. No. 11/650,014.
Kennedy, "Methods and Apparatuses for Configuration Automation", U.S. Appl. No. 10/805,144, 59 pages.
Roos, Gina , "Agilent's new proximity sensor beats the fumble-fingered competition hands down . . . literally", *eeProductCenter*, URL:http://www.eeproductcenter.com/showArticle.
jhtml?articleID_46200544, (Sep. 1, 2004), 3 pages.
Universal Remote Control, Inc., "All Complete Control Remotes Now Use Narrow Band RF", http://www.universalremote.com/corporate/press_release.php?press=13, 2008.
Universal Remote Control, Inc., "MX-950 (The Aurora)", www.unversalremote.com, (2005).
Universal Remote Control, Inc., "Operating System with the Aurora MX-950", *MX-950 Owners Manual* (2005).

* cited by examiner

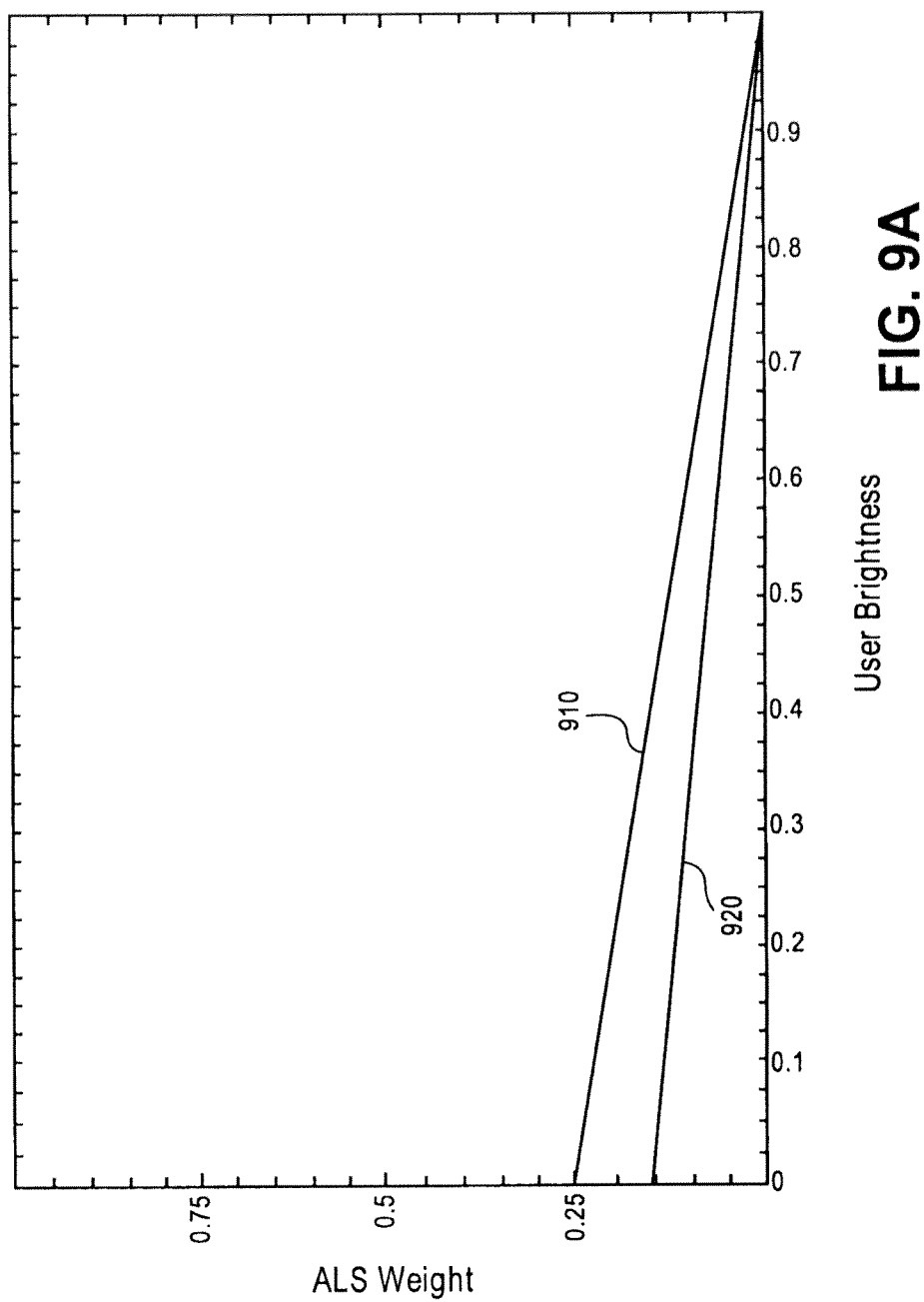

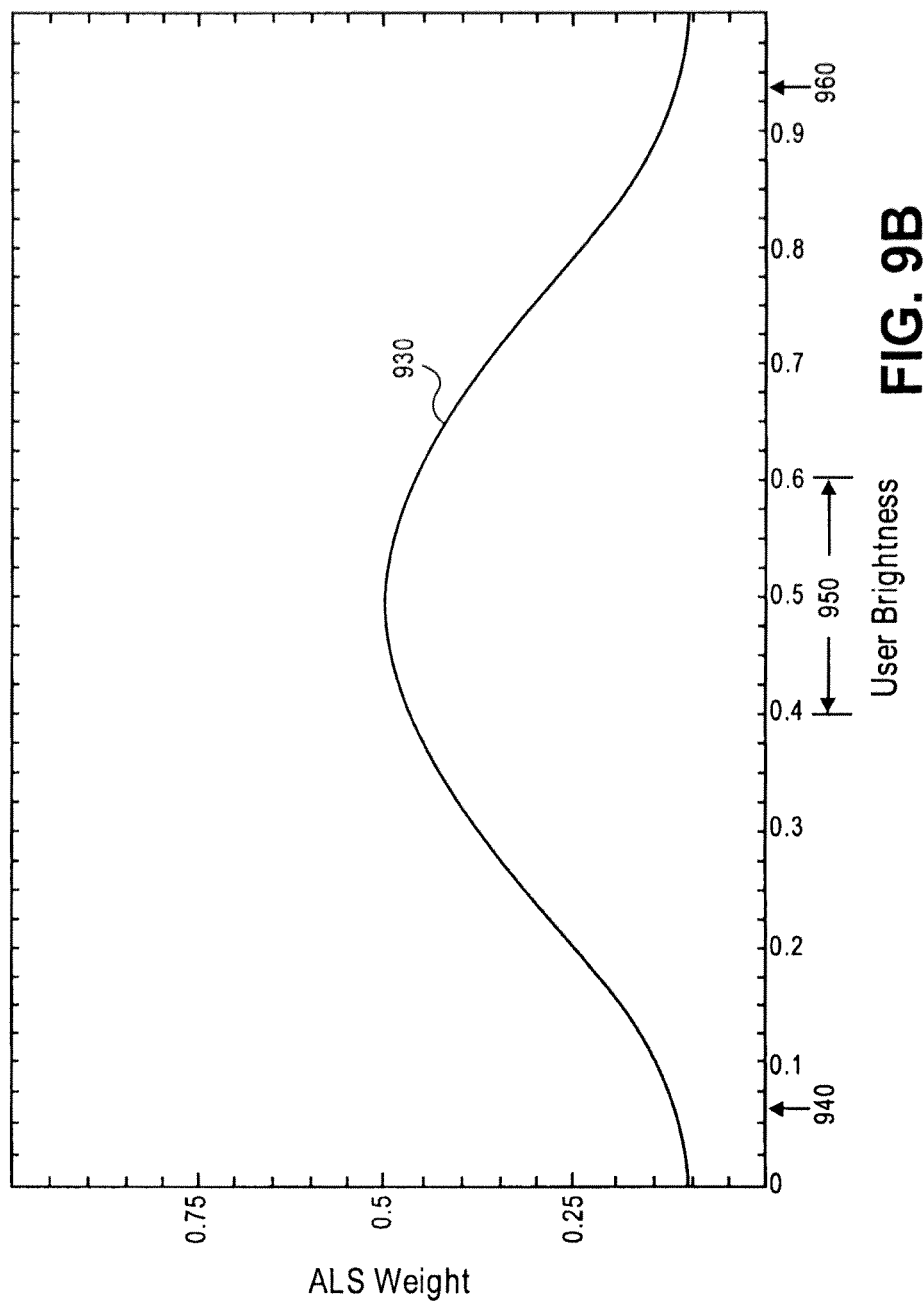

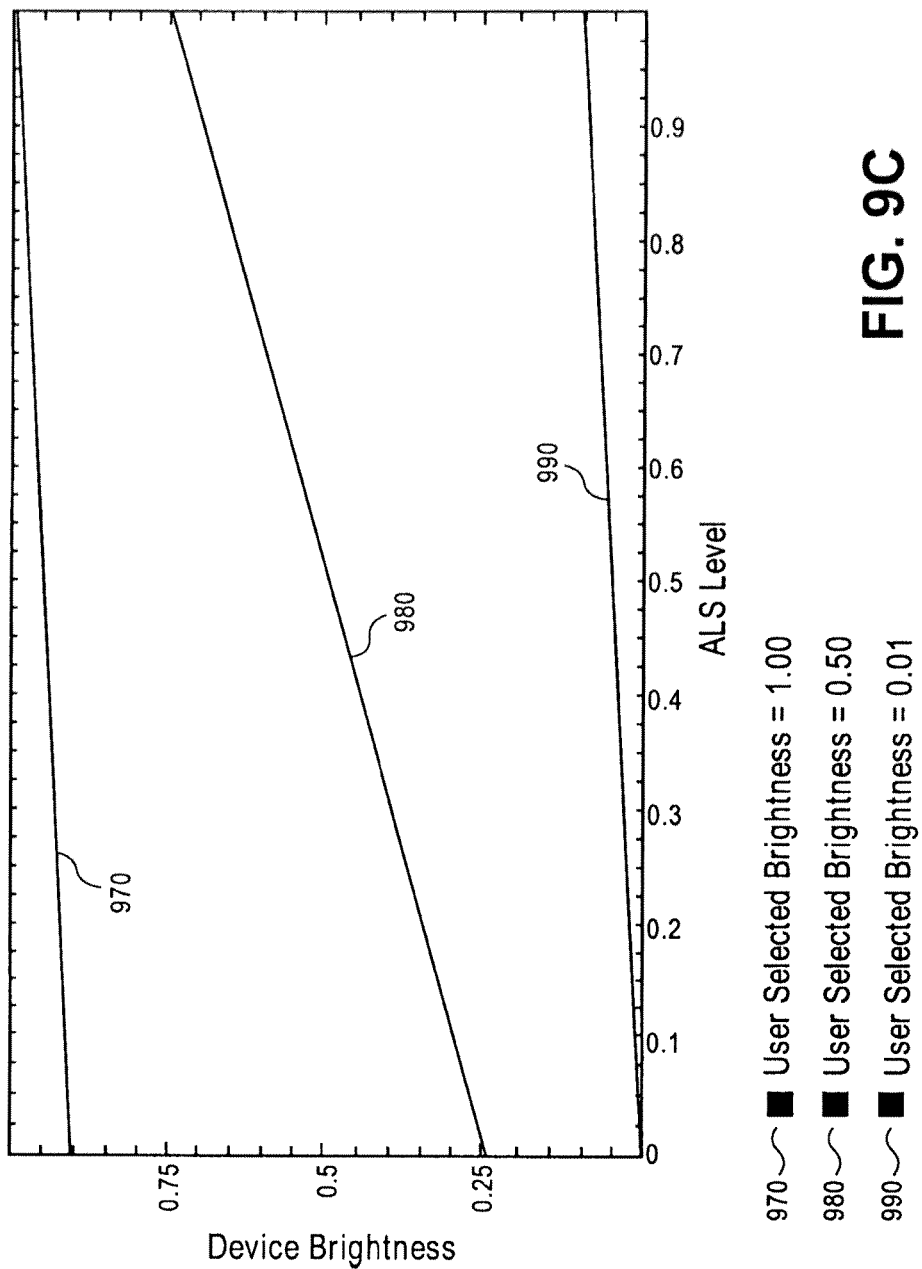

BACKLIGHT AND AMBIENT LIGHT SENSOR SYSTEM

This application is a continuation of U.S. application Ser. No. 11/650,014 filed on Jan. 5, 2007 now U.S. Pat. No. 8,031,164.

FIELD OF THE INVENTION

This invention relates to the field of electronic devices and, in particular, to systems and methods for operating a display device of a portable device.

BACKGROUND OF THE INVENTION

Electronic portable and non-portable devices, such as computers and cell phones, are becoming increasingly common. Such portable devices have grown more complex over time, incorporating many features including, for example, MP3 player capabilities, web browsing capabilities, capabilities of personal digital assistants (PDAs) and the like.

The battery life of these portable devices, however, can be limited. Often, the primary draw of battery power is the display device for these portable devices and, in particular, the backlight, which can be used to illuminate the display device. The display device may also be a significant draw of power for non-portable electronic devices. The backlight may provide a background light or color over which text, pictures and/or images are displayed. In many current portable devices, an exemplary process 10 for illuminating the display is shown in FIG. 1A. In this process, the backlight is activated (e.g. turned on to generate light) when a user enters a key input into the electronic device as shown in operation 12. A timer is started at operation 14 in response to activating the backlight, and the electronic device determines, at operation 16, whether a time out of the timer has occurred. If the electronic device receives a user key input at operation 18, the timer restarts (in operation 14) and the process continues as described above. If the electronic device does not receive a user input while the timer is counting, the time out will occur, and the backlight is deactivated at operation 19.

Some of these electronic devices may also include multiple sensors which are used to detect the environment or context associated with these electronic devices. For example, U.S. patent application publication No. 2005/0219228 describes a device which includes many sensors, including a proximity sensor and a light sensor. The outputs from the sensors are processed to determine a device environment or context. The light sensor detects ambient light levels and the proximity sensor detects a proximity to an object, such as a user's ear or face. In this case, there are two separate sensors which require two openings in the housing of the device. This is shown in FIG. 1B, which shows a device 20. The device 20 includes a proximity sensor 22 mounted on a surface of the device 20 and an ambient light sensor 24 also mounted on the surface of the device 20. Each of these sensors is distinct from the other, and separate openings in the surface are needed for each sensor.

SUMMARY OF THE DESCRIPTION

The various apparatuses, software and methods described herein relate to operating a display of an apparatus which receives user input, senses proximity and detects light, such as ambient light, and to systems, such as data processing systems, which use software which changes display control parameters of an electronic device according to the user input and an ambient light level.

According to some embodiments of the inventions, a method of operating a display device of an electronic device, includes receiving a user setting of a display control parameter, and altering, based on the user setting, an effect of an ambient light sensor value (ALS) on control of the display control parameter. Also, the setting may be a change of the user setting and the altering may automatically be caused by the change. Moreover, the display control parameter may be the physical brightness level of a backlight of a display of a portable device. In some cases, the display control parameter may be proportional to the user setting and the light sensor value. The method may additionally include displaying a physical brightness level of a backlight of a display of an electronic device according to the display control parameter.

Further, according to some embodiments of the inventions, a method of operating a display of an electronic device may include receiving a change to a user selected brightness level of a display brightness level, and altering, according to the change, an effect of an ambient light sensor (ALS) output weight of an ambient light sensor output level on control of the display brightness level. Also, the brightness level may be automatically altered for a display of a portable device, and the method may also include receiving a plurality of ambient light sensor output levels from a plurality of ambient light sensors, weighting each of the plurality of ambient light sensor outputs depending on a location of each of the plurality of ambient light sensors on the device, and setting the ambient light sensor output level to an aggregate of the weighted plurality of ambient light sensor outputs. It is also considered that the physical brightness level may be proportional to the ambient light sensor output level times the weight, and an increase in the user selected brightness level automatically decreases the ambient light sensor output weight according to a linear relationship or automatically alters the ambient light sensor output weight according to a "bell" shaped curve relationship.

Likewise, according to embodiments of the inventions, a method of operating a display of an electronic device includes receiving a change to display brightness output level or an ambient light sensor output level, and altering, according to the change, wherein the display contrast output level is based on the display brightness output level and the ambient light sensor output level. Moreover, an increase in the display brightness output level may automatically cause a decrease in the display contrast output level, and/or an increase in the sensor output level may automatically cause an increase in the display contrast output level.

According to some embodiments of the inventions, a method of operating a display of an electronic device may include receiving a user input to control a user interface feature level, and setting a weight of a light sensor (ALS) output value that the user interface feature level is based on. In some instances, the user input may be a change to a user setting and the change may automatically cause the weight to change.

Finally, in some embodiments, a method of operating a proximity sensor of an electronic device includes receiving a light sensor output, and altering, according to the output, an on/off setting of a proximity sensor.

Other apparatuses, data processing systems, methods and machine readable media are also described.

BRIEF DESCRIPTION OF THE DRAWINGS

The present invention is illustrated by way of example and not limitation in the figures of the accompanying drawings in which like references indicate similar elements.

FIG. 9A is a graph showing examples of ambient light sensor (ALS) weight ranges versus user selected brightness range according to a linear relationship;

FIG. 9B shows an example of an ALS weight range versus user selected brightness range according to a "bell" shaped curve relationship;

FIG. 9C shows examples of device physical brightness level ranges versus ALS output level range for a "bell" shaped curve relationship between ALS weight and user selected brightness;

DETAILED DESCRIPTION

Figure 1A:
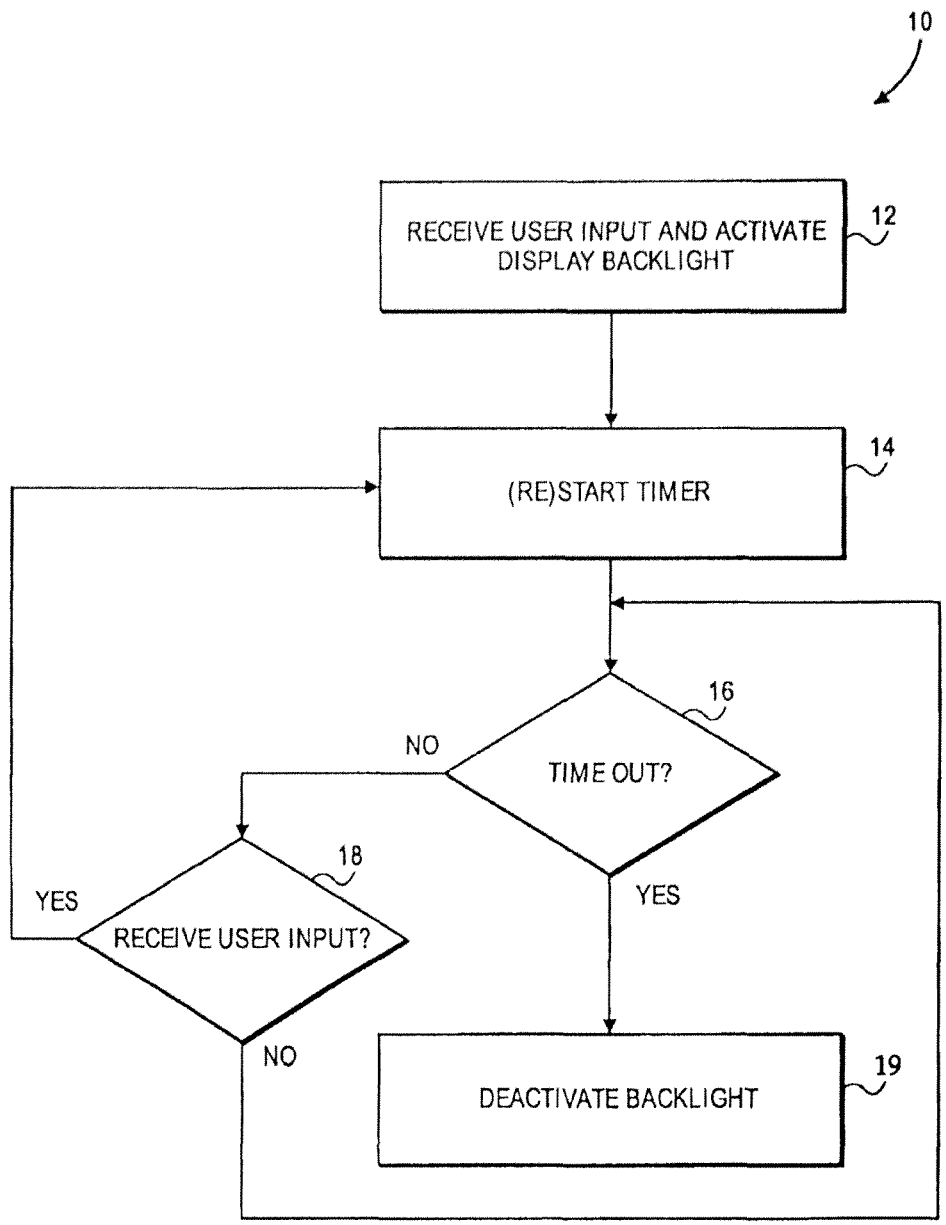
FIG. 1A is flow chart of a prior art method for responding to user input and controlling the backlight of a display in response to the user input.
Figure 1B:
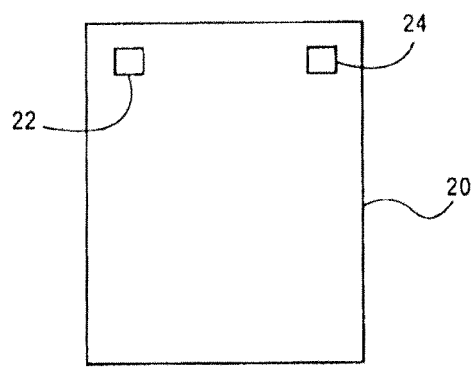
FIG. 1B shows an example of a prior art device which includes two separate sensors.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a through understanding of various embodiments of the present invention. However, in certain instances, well-known or conventional details are not described in order to provide a concise discussion of embodiments of the present inventions.

Some portions of the detailed descriptions which follow are presented in terms of algorithms which include operations on data stored within a computer memory. An algorithm is generally a self-consistent sequence of operations leading to a desired result. The operations typically require or involve physical manipulations of physical quantities. Usually, though not necessarily, these quantities take the form of electrical or magnetic signals capable of being stored, processed, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving" or "altering" or "processing" or "computing" or "calculating" or "determining" or "displaying" or the like, can refer to the action and processes of a data processing device or system, or similar electronic device, that manipulates and transforms data represented as physical (electronic) quantities within the system's registers, storage devices, and memories into other data similarly represented as physical quantities within the system's memories, storage devices, or registers or other such information storage, transmission or display devices.

The present invention can relate to an apparatus for performing one or more of the acts or operations described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs, and magnetic-optical disks, read-only memories (ROMs), random access memories (RAMs), flash memory, erasable programmable ROMs (EPROMs), electrically erasable programmable ROMs (EEPROMs), magnetic or optical cards, or any type of media suitable for storing electronic instructions, and each coupled to a bus.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple Computer, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone (s), or on the display device, or on both display device and a speaker or earphone(s). Examples of a portable media player are described in published U.S. patent application Nos. 2003/0095096 and 2004/0224638, both of which are incorporated herein by reference.

Embodiments of the inventions described herein may be part of other types of data processing systems, such as, for example, entertainment systems or personal digital assistants (PDAs), or general purpose computer systems, or special purpose computer systems, or an embedded device within another device, or cellular telephones which do not include media players, or devices which combine aspects or functions of these devices (e.g., a media player, such as an iPod®, combined with a PDA, an entertainment system, and a cellular telephone in one portable device).

Figure 2:
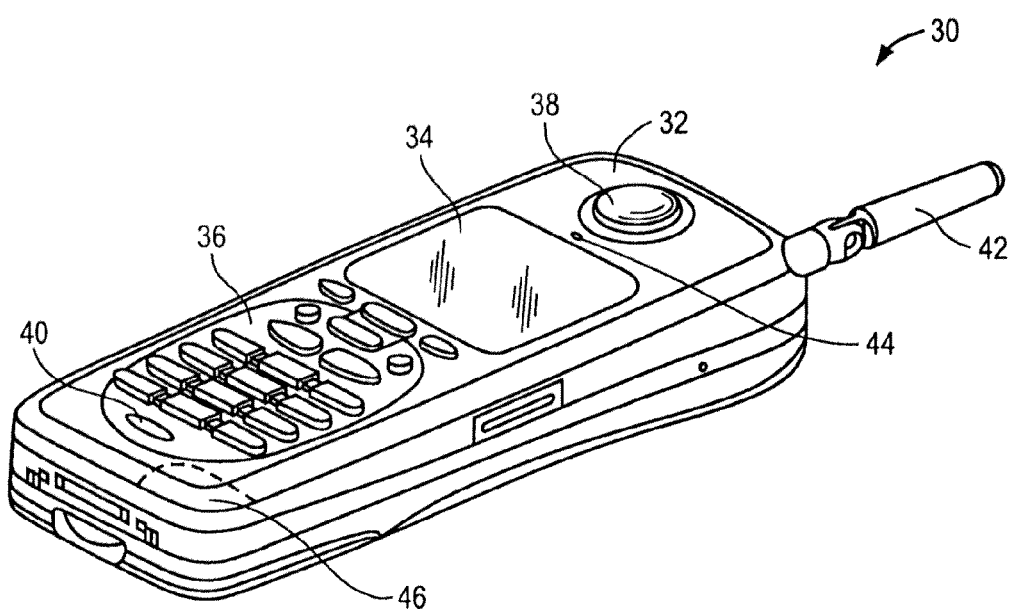
FIG. 2 is a perspective view of a portable device in accordance with one embodiment of the present invention.

FIG. 2 illustrates a portable device 30 according to one embodiment of the invention. FIG. 2 shows a wireless device in a telephone configuration having a "candy-bar" style. In FIG. 2, the wireless device 30 may include various features such as a housing 32, a display device 34, an input device 36 which may be an alphanumeric keypad, a speaker 38, a microphone 40 and an antenna 42. The wireless device 30 also may include an ambient light sensor (ALS) and/or proximity sensor 44 and an accelerometer 46. It will be appreciated that the embodiment of FIG. 2 may use more or fewer sensors and may have a different form factor from the form factor shown in FIG. 2. It will also be appreciated that the particular locations of the above-described features may vary in alternative embodiments.

The display device 34 may be, for example, a liquid crystal display (LCD) which does not include the ability to accept inputs or a touch input screen which also includes an LCD. Device 34 may be operated as described herein and may include a backlight as described herein. The input device 36 may include, for example, buttons, switches, dials, sliders, keys or keypad, navigation pad, touch pad, touch screen, and the like.

The ALS and/or proximity sensor 44 may describe one or more ALS sensors, proximity sensors, and/or combined proximity and ALS sensors. Sensor 44 may detect location (e.g. at least one of X, Y, Z), direction of motion, speed, etc. of objects relative to the wireless device 30, and/or an ambient light environment at device 30.

Figure 3:
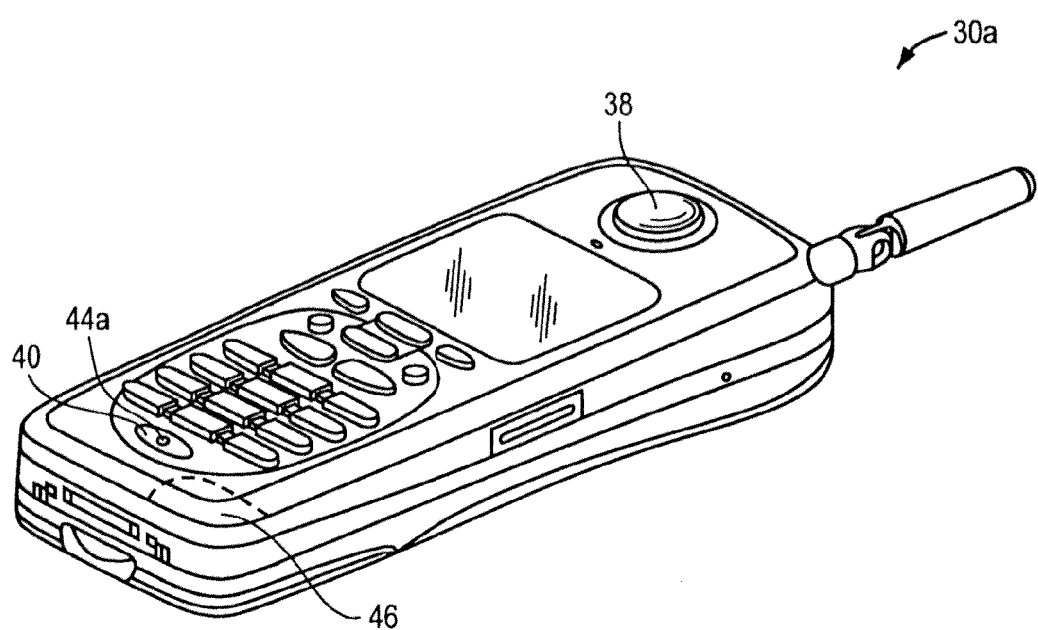
FIG. 3 is a perspective view of a portable device in accordance with one embodiment of the present invention.

In addition, a processing device (not shown) is coupled to the proximity sensor(s) 44. The processing device may be used to determine the location of objects and/or an ambient light environment relative to the portable device 30, the ALS and/or or proximity sensor 44 based on the ambient light, location and/or movement data provided by the ALS and/or proximity sensor 44. The ALS and/or proximity sensor may continuously or periodically monitor the ambient light and/or object location. The proximity sensor may also be able to determine the type of object it is detecting. The ALSs described herein may be able to detect in intensity, brightness, amplitude, or level of ambient light and/or ambient visible light, incident upon the ALS and/or display device. FIG. 3 shows an alternative portable device 30a, which is similar to the portable device 30 illustrated in FIG. 2. The portable device 30a shown in FIG. 3 can differ from the portable device 30 shown in FIG. 2 in that the ALS and/or proximity sensor 44a (FIG. 3) is located at or near the microphone 40.

Figure 4:
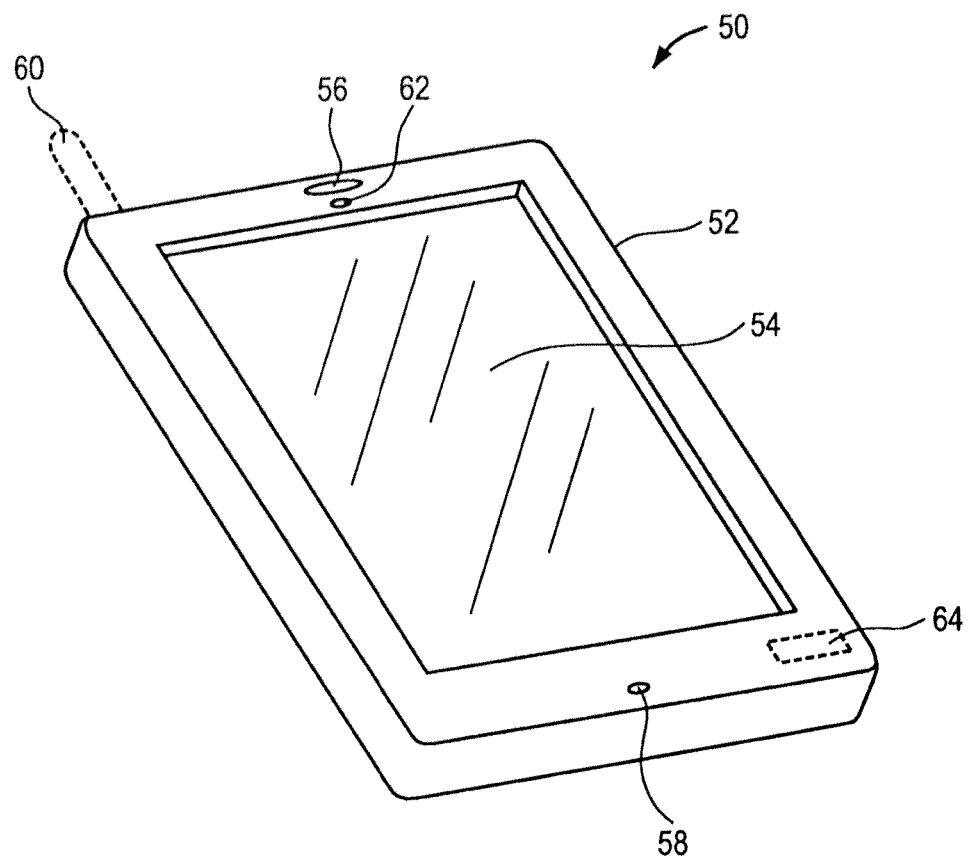
FIG. 4 is a perspective view of a portable device in accordance with one embodiment of the present invention.

FIG. 4 shows a portable device 50 in accordance with one embodiment of the invention. The portable device 50 may include a housing 52, a display/input device 54, a speaker 56, a microphone 58 and an optional antenna 60 (which may be visible on the exterior of the housing or may be concealed within the housing). The portable device 50 also may include an ALS and/or proximity sensor 62 and an accelerometer 64. The portable device 50 may be a cellular telephone or a device which is an integrated PDA and a cellular telephone or a device which is an integrated media player and a cellular telephone or a device which is both an entertainment system (e.g. for playing games) and a cellular telephone, or the portable device 50 may be other types of devices described herein. In one particular embodiment, the portable device 50 may include a cellular telephone and a media player and a PDA, all contained within the housing 52. The portable device 50 may have a form factor which is small enough that it fits within the hand of a normal adult and is light enough that it can be carried in one hand by an adult. It will be appreciated that the term "portable" means the device can be easily held in an adult user's hands (one or both); for example, a laptop computer and an iPod are portable devices.

In one embodiment, the display/input device 54 may include a multi-point touch input screen in addition to being a display, such as an LCD. A processing device (not shown) may be coupled to the display/input device 54. The processing device may be used to calculate proximity, ALS and/or touches on the touch panel.

The data acquired from the ALS and/or proximity sensor 62 and the display/input device 54 can be combined to gather information about the user's location (e.g., about the ambient light environment of the user, device, and/or display) and activities as described herein. The data from the ALS and/or proximity sensor 62 and the display/input device 54 can be used to change one or more settings of the portable device 50, such as, for example, change an illumination or backlight setting of the display/input device 54.

In embodiments, the display/input device 54 occupies a large portion, substantially all of, or at least 75% of one surface (e.g. the top surface) of the housing 52 of the portable device 50. In an alternate embodiment the display/input device can occupies less than 75% of one surface (e.g. the top surface) of the housing 52 of the portable device 50. Also, in alternative embodiments, the portable device 50 may include a display which does not have input capabilities, but the display still occupies a large portion of one surface of the portable device 50. In this case, the portable device 50 may include other types of input devices such as a QWERTY keyboard or other types of keyboard which slide out or swing out from a portion of the portable device 50.

Figure 5A:
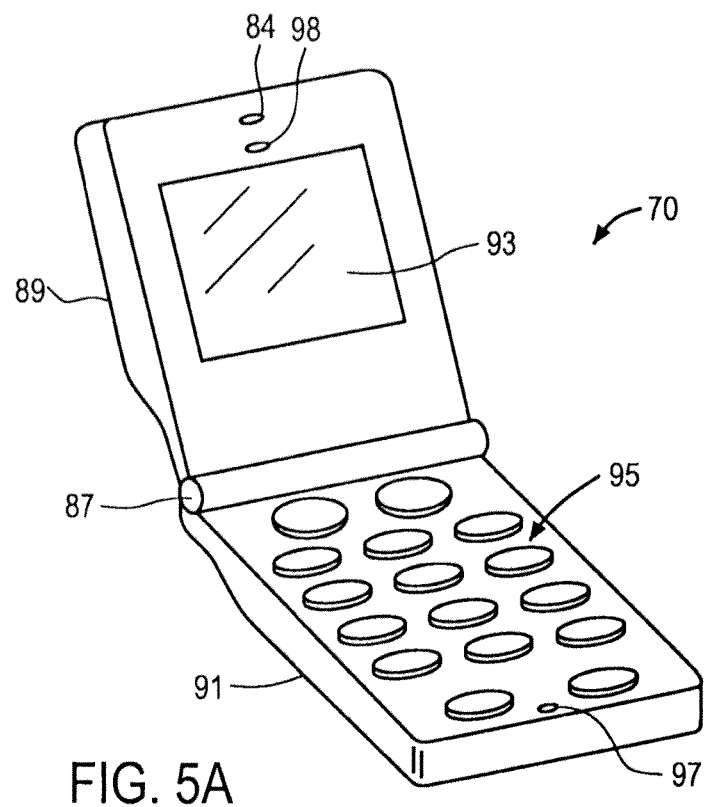
FIG. 5A is a perspective view of a portable device in a first configuration (e.g. in an open configuration) in accordance with one embodiment of the present invention.
Figure 5B:
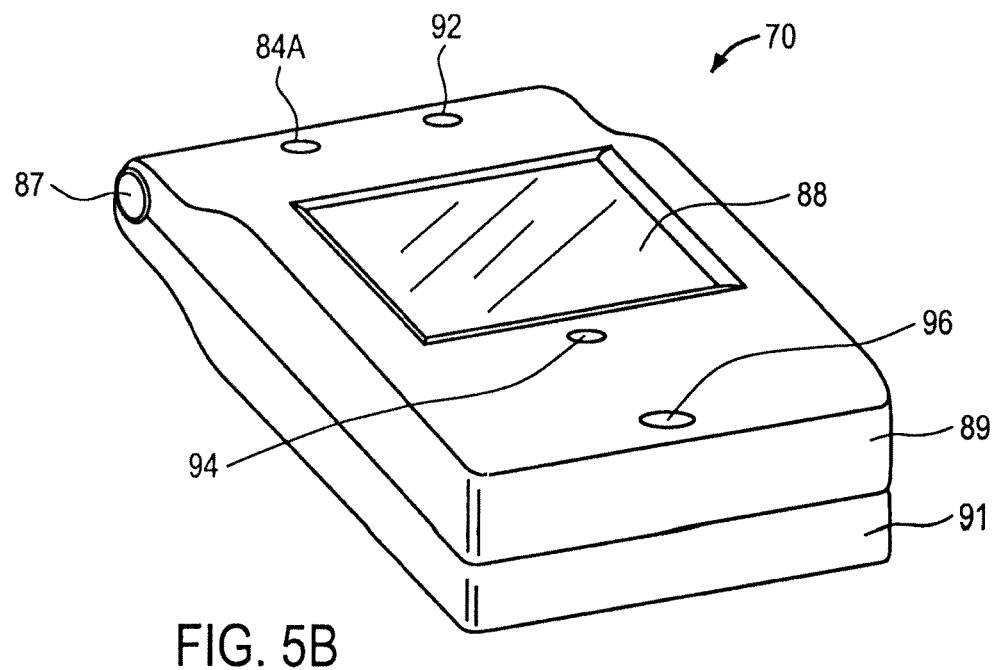
FIG. 5B is a perspective view of the portable device of FIG. 5A in a second configuration (e.g. a closed configuration) in accordance with one embodiment of the present invention.

FIGS. 5A and 5B illustrate a portable device 70 according to one embodiment of the invention. The portable device 70 may be a cellular telephone which includes a hinge 87 that couples a display housing 89 to a keypad housing 91. The hinge 87 allows a user to open and close the cellular telephone so that it can be placed in at least one of two different configurations shown in FIGS. 5A and 5B. In one particular embodiment, the hinge 87 may rotatably couple the display housing to the keypad housing. In particular, a user can open the cellular telephone to place it in the open configuration shown in FIG. 5A and can close the cellular telephone to place it in the closed configuration shown in FIG. 5B. The keypad housing 91 may include a keypad 95 which receives inputs (e.g. telephone number inputs or other alphanumeric inputs) from a user and a microphone 97 which receives voice input from the user. The display housing 89 may include, on its interior surface, a display 93

(e.g. an LCD) and a speaker 98 and an ALS and/or proximity sensor 84; on its exterior surface, the display housing 89 may include a speaker 96, a temperature sensor 94, a display 88 (e.g. another LCD), an ambient light sensor 92, and an ALS and/or proximity sensor 84A. Hence, in this embodiment, the display housing 89 may include a first ALS and/or proximity sensor on its interior surface and a second ALS and/or proximity sensor on its exterior surface. The first ALS and/or proximity sensor may be used to detect an ambient light environment and/or a user's head or ear being within a certain distance of the first ALS and/or proximity sensor and to cause an illumination setting of displays 93 and 88 to be changed (automatically in some cases) in response to this detecting.

In at least certain embodiments, the portable device 70 may contain components which provide one or more of the functions of a wireless communication device such as a cellular telephone, a media player, an entertainment system, a PDA, or other types of devices described herein. In one implementation of an embodiment, the portable device 70 may be a cellular telephone integrated with a media player which plays MP3 files, such as MP3 music files.

It is also considered that an electronic device or portable device described herein, such as the devices shown in FIGS. 2, 3, 4, 5A and 5B, may have a form factor or configuration having a "candy-bar" style, a "flip-phone" style, a "sliding" form, and or a "swinging" form. For example, a "candy-bar" style may be described above in FIG. 2 for wireless device 30. Also, a "flip-phone" style may be described above in FIGS. 5A and 5B for device 70. A "sliding" form may describe where a keypad portion of a device slides away from another portion (e.g., the other portion including a display) of the device, such as by sliding along guides or rails on one of the portions. A "swinging" form may describe where a keypad portion of a device swings sideways away (as opposed to the "flip-phone" style swinging up and down) from another portion (e.g., the other portion including a display) of the device, such as by swinging on a hinge attaching the portions.

Figure 6:
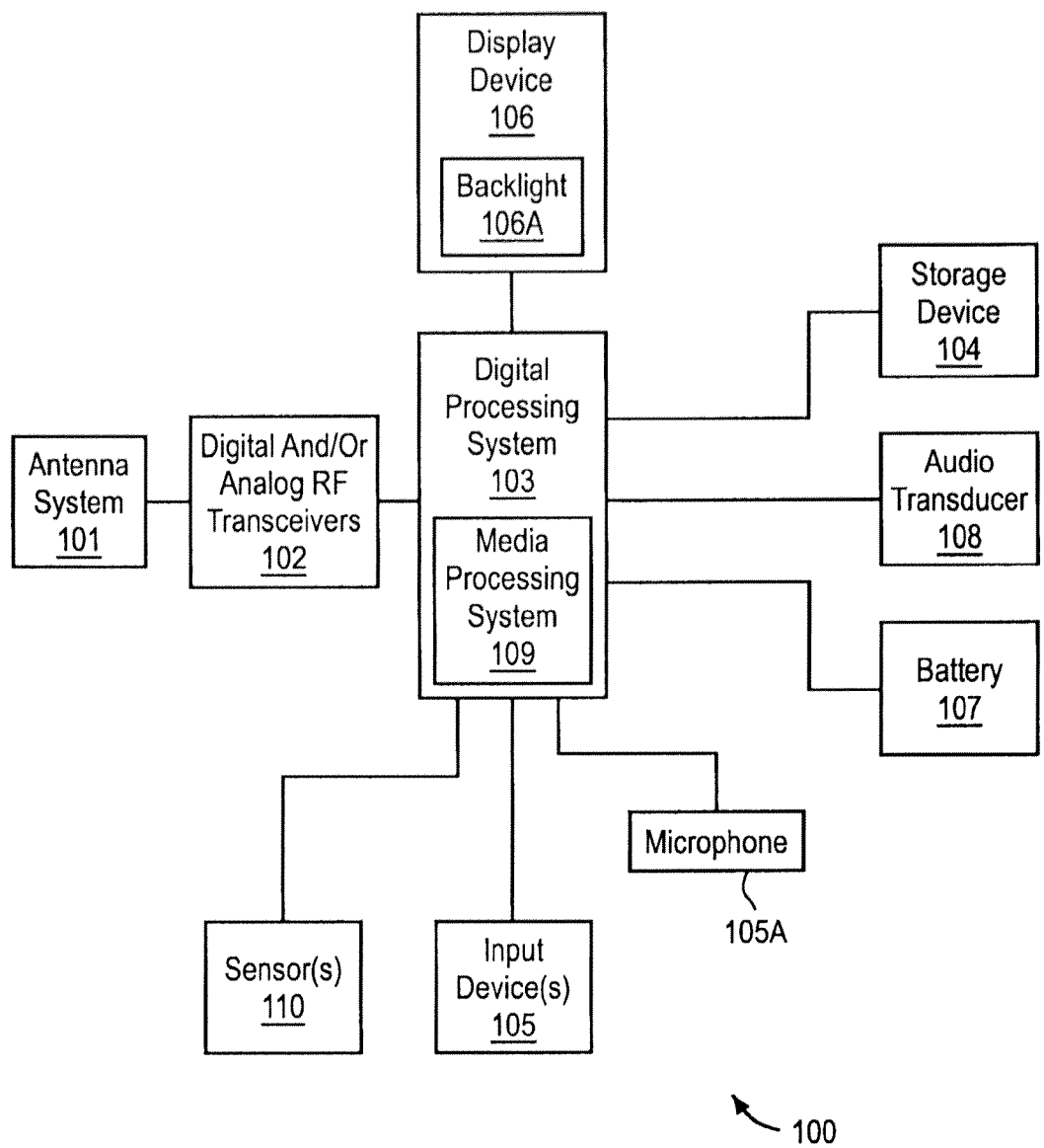
FIG. 6 is a block diagram of a system in which embodiments of the present invention can be implemented.

Each of the devices shown in FIGS. 2, 3, 4, 5A and 5B may be a wireless communication device, such as a cellular telephone, and may include a plurality of components which provide a capability for wireless communication. FIG. 6 shows an embodiment of a wireless device 100 which includes the capability for wireless communication. The wireless device 100 may be included in any one of the devices shown in FIGS. 2, 3, 4, 5A and 5B, although alternative embodiments of those devices of FIGS. 2-5B may include more or fewer components than the wireless device 100.

Wireless device 100 may include an antenna system 101. Wireless device 100 may also include one or more digital and/or analog radio frequency (RF) transceivers 102, coupled to the antenna system 101, to transmit and/or receive voice, digital data and/or media signals through antenna system 101. Transceivers 102, may include on or more infrared (IR) transceivers, WHYFI transceivers, Blue Tooth™ transceivers, and/or wireless cellular transceivers.

Wireless device 100 may also include a digital processing device or system 103 to control the digital RF transceivers and to manage the voice, digital data and/or media signals. Digital processing system 103 may be a general purpose processing device, such as a microprocessor or controller for example. Digital processing system 103 may also be a special purpose processing device, such as an ASIC (application specific integrated circuit), FPGA (field-programmable gate array) or DSP (digital signal processor). Digital processing system 103 may also include other devices, as are known in the art, to interface with other components of wireless device 100. For example, digital processing system 103 may include analog-to-digital and digital-to-analog converters to interface with other components of wireless device 100. Digital processing system 103 may include a media processing system 109, which may also include a general purpose or special purpose processing device to manage media, such as files of audio data.

Wireless device 100 may also include a storage device 104 (e.g., memory), coupled to the digital processing system, to store data and/or operating programs for the wireless device 100. Storage device 104 may be, for example, any type of solid-state or magnetic memory device.

Wireless device 100 may also include one or more input devices 105 (e.g., user interface controls, or I/O devices), coupled to the digital processing system 103, to accept user inputs (e.g., telephone numbers, names, addresses, media selections, user settings, user selected brightness levels, etc.) Input device 105 may be, for example, one or more of a keypad, a touchpad, a touch screen, a pointing device in combination with a display device or similar input device.

Wireless device 100 may also include at least one display device 106, coupled to the digital processing system 103, to display text, images, and/or video. Device 106 may display information such as messages, telephone call information, user settings, user selected brightness levels, contact information, pictures, movies and/or titles or other indicators of media being selected via the input device 105. Display device 106 may be, for example, an LCD display device. In one embodiment, display device 106 and input device 105 may be integrated together in the same device (e.g., a touch screen LCD such as a multi-touch input panel which is integrated with a display device, such as an LCD display device). Examples of a touch input panel and a display integrated together are shown in U.S. published application No. 20060097991. The display device 106 may include a backlight 106a to illuminate the display device 106 under certain circumstances. Device 106 and/or backlight 106a may be operated as described herein, such as to set or alter a display parameter as described herein. It will be appreciated that the wireless device 100 may include multiple displays. The descriptions above for display 106 and backlight 106a apply to other displays described herein, including those referred to for FIGS. 2-5 and 9-10.

Wireless device 100 may also include a battery 107 to supply operating power to components of the system including digital RF transceivers 102, digital processing system 103, storage device 104, input device 105, microphone 105A, audio transducer 108, media processing system 109, sensor(s) 110, and display device 106. Battery 107 may be, for example, a rechargeable or non-rechargeable lithium or nickel metal hydride battery.

Wireless device 100 may also include one or more sensors 110 coupled to the digital processing system 103. The sensor(s) 110 may include, for example, one or more of a proximity sensor, accelerometer, touch input panel, ambient light sensor, ambient noise sensor, temperature sensor, gyroscope, a hinge detector, a position determination device, an orientation determination device, a motion sensor, a sound sensor, a radio frequency electromagnetic wave sensor, and other types of sensors and combinations thereof. Based on the data acquired by the sensor(s) 110, various responses may be performed (automatically in some cases) by the digital processing system, such as, for example, activating, deactivating, changing, controlling, and/or altering the backlight 106a. Other responses that may be performed include changing a setting of the input device 105.

Also, in some embodiments, sensors, displays, transceivers, digital processing systems, processor, processing logic, memories and/or storage device may include one or more integrated circuits disposed on one or more printed circuit boards (PCB).

Figure 7A:
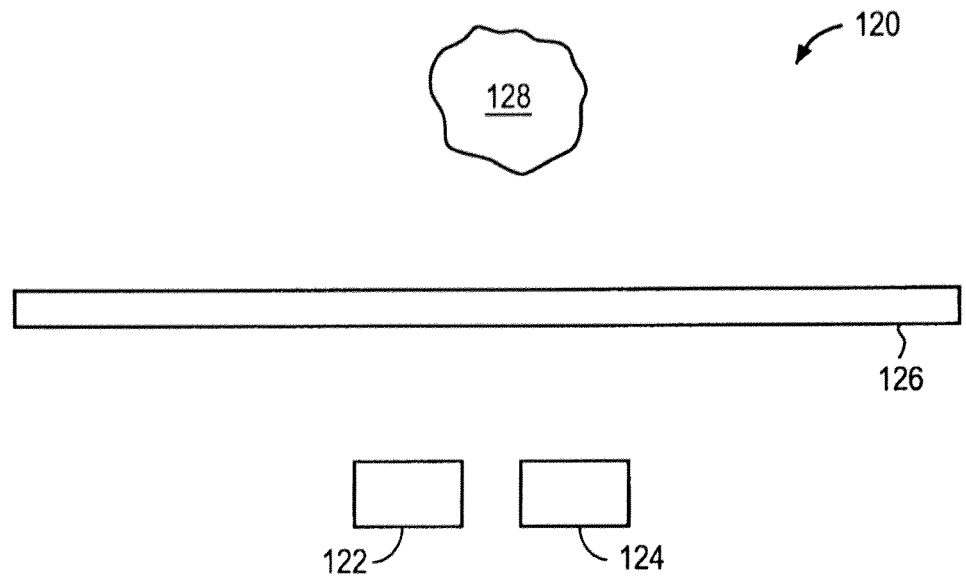
FIG. 7A is a schematic side view of a proximity sensor in accordance with one embodiment of the present invention.
Figure 7B:
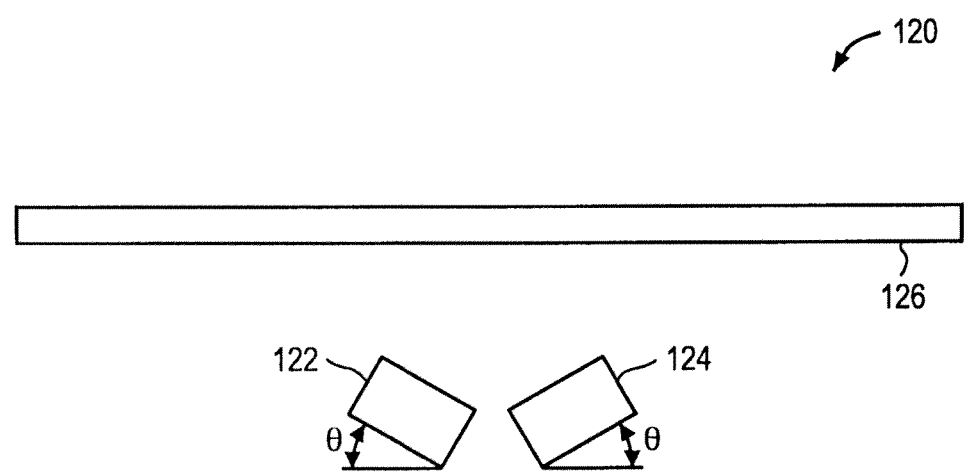
FIG. 7B is a schematic side view of an alternative proximity sensor in accordance with one embodiment of the present invention.

FIGS. 7A and 7B illustrate exemplary proximity sensors in accordance with embodiments of the invention. It will be appreciated that, in alternative embodiments, other types of proximity sensors, such as capacitive sensors or sonar-like sensors, may be used rather than the proximity sensors shown in FIGS. 7A and 7B. In FIG. 7A, the proximity sensor 120 includes an emitter 122, a detector 124, and a window 126. The emitter 122 generates light in the infrared (IR) bands, and may be, for example, a Light Emitting Diode (LED). The detector 124 is configured to detect changes in light intensity and may be, for example, a phototransistor. The window 126 may be formed from translucent or semi-translucent material. In one embodiment, the window 126 is an acoustic mesh, such as, for example, a mesh typically found with a microphone or speaker of the electronic device. In other embodiments, the window 126 may be MicroPerf, IR transparent strands wound in a mesh, or a cold mirror.

During operation, the light from the emitter 122 hits an object 128 and scatters (e.g., is reflected by the object) when the object is present above the window 126. The light from the emitter may be emitted in square wave pulses which have a known frequency, thereby allowing the detector 124 to distinguish between ambient light and light from emitter 122 which is reflected by an object, such as the user's head or ear or a material in a user's pocket, back to the detector 124. At least a portion of the scattered light is reflected towards the detector 124. The increase in light intensity is detected by the detector 124, and this is interpreted by a processing device or system (not shown in FIG. 7A) to mean an object is present within a short distance of the detector 124. If no object is present or the object is beyond a certain distance from the detector 124, an insufficient or smaller amount of the emitted light is reflected back towards the detector 124, and this is interpreted by the processing system (not shown in FIG. 7A) to mean that an object is not present or is at a relatively large distance. In each case, the proximity sensor is measuring the intensity of reflected light which is related to the distance between the object which reflects the light and detector 124.

In FIG. 7B, the emitter 122 and detector 124 of the proximity sensor are angled inward towards one another to improve detection of the reflected light, but the proximity sensor of FIG. 7B otherwise operates in a manner similar to the proximity sensor of FIG. 7A.

A proximity sensor in one embodiment of the inventions includes the ability to both sense proximity and detect electromagnetic radiation, such as ambient light, from a source other than the emitter of the proximity sensor. The use of IR light for both the emitter and the detector of the proximity sensor may be advantageous because IR light is substantially present in most sources of ambient light (such as sunshine, incandescent lamps, LED light sources, candles, and to some extent, even fluorescent lamps). Thus, the detector can detect ambient IR light, which will generally represent, in most environments, ambient light levels at wavelengths other than IR, and use the ambient IR light level to effectively and reasonably accurately represent ambient light levels at wavelengths other than IR.

Figure 7C:
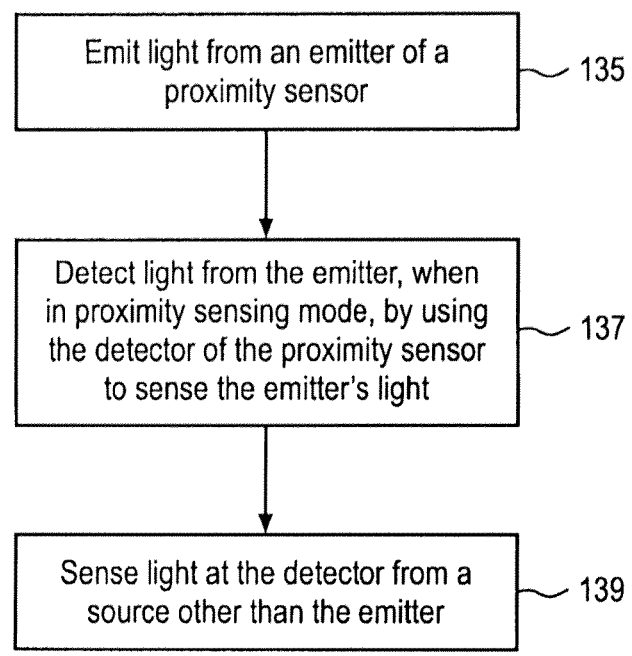
FIG. 7C is a flow chart which shows a method of operating a proximity sensor which is capable of detecting light from a source other than the emitter of the proximity sensor.
Figure 7D:
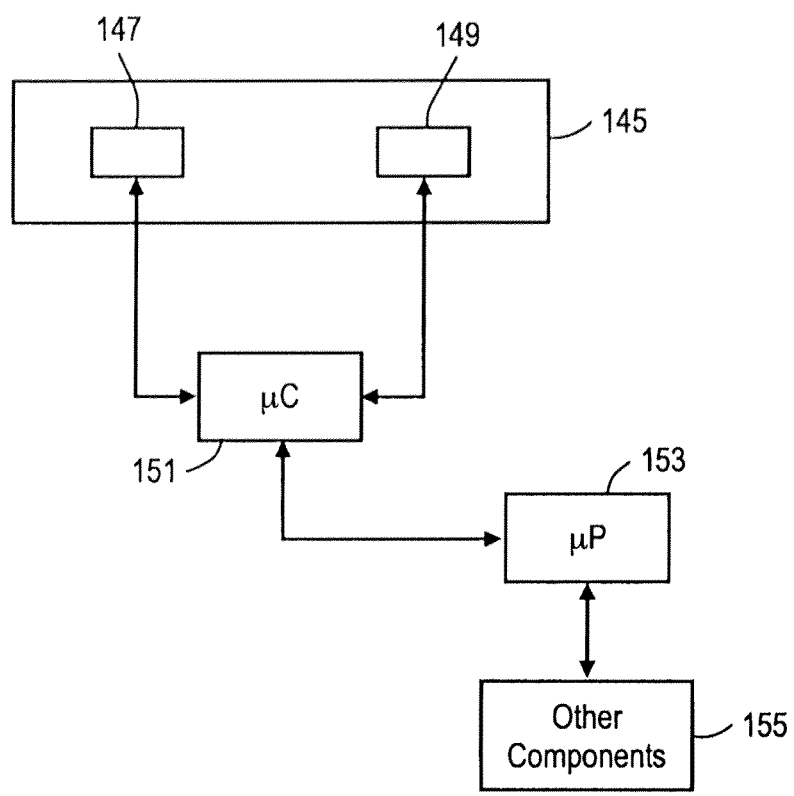
FIG. 7D shows an example of a proximity sensor with associated logic.

A method of operating a proximity sensor which includes the ability to both sense proximity and detect light is shown in FIG. 7C and an example, in block diagram form, of such a proximity sensor is shown in FIG. 7D. The method of FIG. 7C may use the proximity sensor shown in FIG. 7D or other proximity sensors. The method includes operation 135 in which electromagnetic radiation (e.g. IR light) is emitted from the emitter of the proximity sensor. The emitter may emit the radiation in a known, predetermined pattern (e.g. a train of square wave pulses of known, predetermined pulse width and frequency) which allows a detector to distinguish between ambient radiation and radiation from the emitter. In operation 137, the detector of the proximity sensor detects and measures light from the emitter when the detector is operating in proximity sensing mode. A processor coupled to the detector may process the signal from the detector to identify the known predetermined pattern of radiation from the emitter and to measure the amount of radiation from the emitter. In operation 139, the detector is used in a mode to sense radiation (e.g. ambient IR light) from a source other than the emitter; this operation may be implemented in a variety of ways. For example, the emitted light from the emitter may be disabled by a shutter (either a mechanical or electrical shutter) placed over the emitter or the emitter's power source may be turned off (thereby stopping the emission of radiation from the emitter). Alternatively, known signal processing techniques may be used to remove the effect of the emitter's emitted light which is received at the detector in order to extract out the light from sources other than the emitter. It will be appreciated that operations 135, 137 and 139 may be performed in a sequence which is different than the sequence shown in FIG. 7C.

FIG. 7D shows an embodiment of a range sensing IR proximity sensor 145 which includes the ability to sense and measure proximity and to detect and measure ambient light levels. The proximity sensor 145 includes an IR emitter 147 (e.g. an IR LED) and an IR detector 149. An optional shutter (e.g. an LCD electronic shutter) may be disposed over the emitter 147. The IR emitter 147 and the IR detector 149 may be coupled to a microcontroller 151 which may control switching between proximity sensing mode and ambient light sensing mode by either closing and opening an optional shutter or by turning on and off the power to the IR emitter 147. The output from the IR detector 149 may be provided from the microcontroller 151 to the microprocessor 153 which determines, from data from the proximity sensor 145, at least one proximity value and determines at least one ambient light level value. In an alternative embodiment, the microprocessor may be coupled to the IR emitter 147 and to the IR detector 149 without an intervening microcontroller, and the microprocessor may perform the functions of the microcontroller (e.g. the microprocessor may control switching between proximity sensing mode and ambient light sensing mode). The microprocessor 153 may be coupled to other components 155, such as input (e.g. keypad) or output (e.g. display) devices or memory devices or other sensors or a wireless transceiver system, etc. For example, the microprocessor 153 may be the main processor of the wireless device 100 shown in FIG. 6. In those embodiments in which a shutter over the IR emitter is not used and IR emissions from the IR emitter 147 are received at the IR detector 149 while the IR detector 149 is measuring ambient light levels, the microprocessor 153 (or the microcontroller 151) may filter out the known predetermined pattern of IR light from the IR emitter 147 in order to extract a signal from the IR detector 149 representing the IR light level from sources other than the IR emitter 147.

Figure 8:
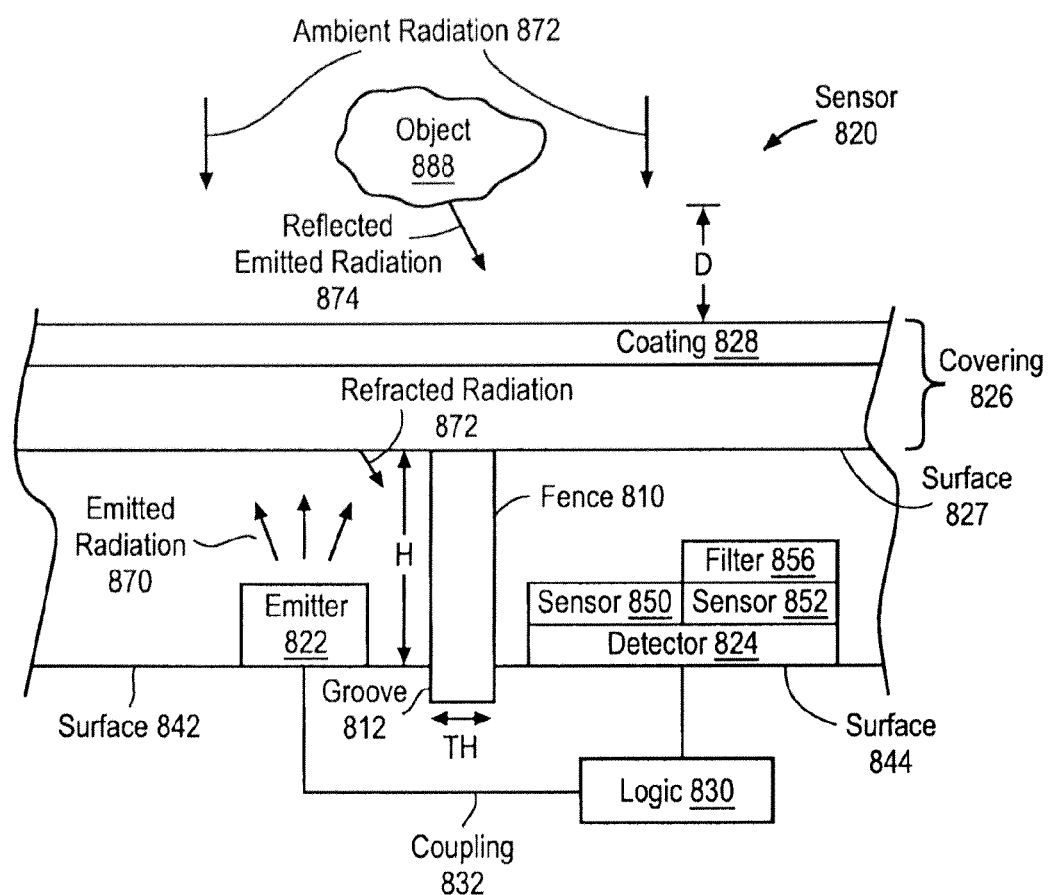
FIG. 8 is a schematic side view of a combined proximity sensor and ambient light sensor in accordance with one embodiment of the invention.

FIG. 8 is a schematic side view of a combined proximity sensor and ambient light sensor in accordance with one embodiment of the invention. FIG. 8 shows combined sensor 820 including emitter 822, detector 824 and covering 826, such as to detect the proximity of an object to the sensor and an ambient light level or intensity at the sensor. FIG. 8 also shows logic 830, such as a processor and/or processing logic for controlling, receiving, scaling, subtracting, and/or determining outputs of components of sensor 820 (e.g., emitter 822, detector 824, logic 830 and components thereof) to determine proximity and/or ambient light. FIG. 8 also shows fence 810, such as a fence that is antireflective or non-transmissive for radiation of emitter 822. Fence 810 may be a fence, a wall or a barrier disposed between the emitter and the detector, extending all the way up to covering 826. Fence 810 is optional. Covering 826 may or may not be a covering similar to covering 126, emitter 822 may or may not be an emitter similar to emitter 122 as described above for FIGS. 7A through 7D.

Emitter 822 is shown emitting emitted radiation 870 which may be refracted as refracted radiation 872 by covering 826. Emitter 822 may be an infrared (IR) light emitter or transmitter, and may emit IR light modulated at a modulation frequency. Also, radiation 870 may be reflected by object 888 as shown by reflected emitter radiation 874, which may be received by detector 824. Object 888 may be an object having proximity D and an IR light reflective surface or material, and may be an object like object 128.

FIG. 8 shows detector 824 including sensor 850, sensor 852, and filter 856. Sensor 850 may be described as a sensor configured to detect electromagnetic radiation from emitter 822, and ambient radiation 872. Sensor 852 may be a sensor as described above for sensor 850, except that sensor 852 is covered with or has filter 856 disposed between sensor 852 and radiation 870, 874, and 872. Filter 856 may be described as a passband filter for IR light, but not passing visible light, such as to pass IR light from incandescent bulbs and fluorescent bulb, as well as radiation 870 and 874, but not to pass visible light from incandescent bulbs and fluorescent bulb. Thus, sensor 852 may detect electromagnetic radiation from radiation 870, radiation 874, and/or ambient IR radiation from radiation 872, but may not receive or sense visible light from radiation 872.

Logic 830 may modulate the emitter IR light and/or to turn the emitter on and off. The IR light from radiation 872 may be filtered out or distinguished from the output of sensor 852 by logic 830. Distinguishing the emitted IR from ambient IR by detecting for emitted IR during one time period and for ambient IR during another may be described as TDM, timeslicing and multiplexing, and/or using a waveform filter. Detector 824 and/or logic 830 may be used to sense proximity of the object to combined sensor 820, and may determine a visible light intensity of ambient radiation 872.

The term "substantially" may refer to the specific value noted herein, or, in some cases, a range within 1, 2 or 5 percent of that value. The terms "processing logic" as described herein may describe a device, a processor, circuitry, software, a memory, and/or a combination of any or all of the above. Similarly, the term "sensor" may include the above descriptions for processing logic. Also, use of the term "detect" and derivations therefrom may be similar to that described herein for use of the term "sense" and derivations thereof, and vice versa.

It will be appreciated that at least some of the sensors which are used with embodiments of the inventions may determine or provide data which represents an analog value. In other words, the data represents a value which can be any one of a set of possible values which can vary continuously or substantially continuously, rather than being discrete values which have quantum, discrete jumps from one value to the next value. Further, the value represented by the data may not be predetermined. For example, alight sensor, such as an ambient light sensor, may determine or provide data that represents a light intensity which is an analog value. For other types of sensors, the data determined or provided by the sensor may represent an analog value.

Moreover, it can be appreciated that at least certain embodiments of the sensors described herein may provide proximity and/or ALS data (e.g., light levels) to a processor or processing logic of an electronic device, a display device, a data processing device, or a data processing system. This may include sending proximity sensor output data (e.g., to detect a proximity of an object) and/or ALS output level or value data (e.g., to identify ambient light environment or level of visible light intensity) to a software application (e.g., instructions executing on a processor). Reference to a "device", an "electronic device", a "portable device", "a data processing system", a "date processing device" or a "system" herein may describe a portable device (such as a lap-top computer or device described for FIGS. 2-10), non-portable device (such as a desktop computer), or a processor or software application (e.g., instructions executed by a processor) of the device referred to. Thus, the software or processor can determine, based upon the data, whether to modify a setting of the device or data processing system. For instance, the processor, software or processing logic may compare the data from one or more ALS outputs to a threshold value to determine a light value (e.g., amount of visible light). Specifically, the comparison may be used to determine when and by how much to modify (e.g., by adjusting, increasing, decreasing, turning on, turning off, or leaving status quo) at least one setting or display control parameter of a display illuminator or device (e.g., a backlight) as described herein. For instance, the following descriptions, apply to displays and backlights described herein.

As noted above, the display (e.g., a liquid crystal display (LCD)) and/or backlight of the display device may represent one of the largest battery draws or drains of a portable device and may also represent a significant power drain for a non-portable device. In these cases, the brighter the backlight, the more battery energy or power is consumed maintaining the bright level of backlight. Thus, in some embodiments, it may be beneficial to reduce the effect or amount of battery draw or drain that the backlight of the display device has on the battery. However, it may be desired to have a bright or high contrast backlight during periods to overcome a bright ambient light environment, or when desired by a user to maintain the backlight brightness or high contrast. Thus, to extend battery life and reduce battery draw, it may be helpful to only drive or use display or backlight brightness (e.g., intensity or illumination) or contrast at a maximum level or value high enough to overcome the ambient light environment at the user, device, or incident upon the display. For example, in some cases, if the user if outdoors in the sun, a bright or increased backlight brightness or high contrast may be more desirable or useful (such as to see text, images, and/or video displayed on the display) than if the user is in a brightly lit room or softly lit room.

According to embodiments, a display device of the electronic device may be "operated" by illuminating (e.g., generating, altering, or displaying) a backlight of the display device based on or considering a user setting and/or an ambient light sensor output. In some embodiments, based on a received user setting and/or based on data acquired by one or more ambient light sensors, a digital processing system (e.g., an electronic deYice) may (automatically in some cases) activate, deactivate, change, control, and/or alter one or more display control parameters of a backlight, such as according to an algorithm implemented by a software application. For instance, a backlight may have various "display control parameters" such as physical brightness level, contrast level, gamma level, and color calibration levels. These levels may be selected, requested or set according to a user setting or level. In addition, these parameters may be set, altered, or controlled by sensor outputs, which may be weighted based on or according to the user setting or selection. Specifically, an electronic device may receive a user setting of a display control parameter and may alter, based on the user setting, an affect of a light sensor value on control of the display control parameter. As a result, the device may set or alter (e.g., by changing, controlling, or adjusting) the display control parameter based on (e.g., according to, caused by, or due to) the user setting and the ALS value. Moreover, the ALS value may be a weighted value, weighted based on or according to the received user setting or selection. The amount of weighting may be described as an ALS weight to the ALS value. The parameter may be altered automatically, such as by a device, a processor, and/or software. Alternatively the parameter may be altered non-automatically, such as by receiving a user selection to cause the alteration. For instance, upon determining that an alteration is to be made, the device, processor, and/or software may prompt the user to confirm or select the alteration. Upon receipt of the user confirmation or selection, the alteration occurs (e.g., it is optional until user selection).

Ambient light level data may be provided by an ambient light sensor, which indicates the level of light intensity surrounding that sensor. Ambient light data may also be obtained from two or more ambient light sensors, which are disposed at different positions on the device. An adjustable backlight brightness may be provided by altering the backlight brightness based on or according to the output of one or more than one ALS on the electronic device. The number of outputs may be weighted depending on or based on the location of each sensor on the device. For example, one ambient light sensor may be on one side of the device, and another ambient light sensor may be on another side of the device. ALS sensor on the face of the device pointing at the user (and/or away from a display) may be given a higher weight as it or they best represent light falling directly on the display or a cover of the display. For example, see sensors 44, 44a, 62, 84 of FIGS. 2-5A respectively. Alternatively, sensors facing the ground may be given lower weights, as they face away from light incident upon the display. For example, these sensors may be sensors on a surface opposite that on which sensors 44, 44a, 62, 84 are mounted or disposed, of FIGS. 2-5A respectively. Sensors not pointing at the user, away from a display, or toward the ground may be given a weight between a weight given to a sensor pointing at the user (and/or away from a display) and a sensor pointing toward the ground. For example, these sensors may be sensors on a surface sideways or perpendicular to that on which sensors 44, 44a, 62, 84 are mounted or disposed, of FIGS. 2-5A respectively. It is also considered that the definition of where a sensor is pointing may change due to the orientation, sliding, opening, or closing of a portion of an electronic device. For instance, in FIG. 5A (e.g., when the device is open or on), sensor 84 may be pointing at the user, while a sensor on a surface opposite that on which sensors 84 is mounted (e.g., sensors 84A and 92) may be pointing toward the ground. Alternatively, in FIG. 5B (e.g., when the device is closed or off), sensor 84A may be pointing at the user, while a sensor on a surface opposite that on which sensors 84A and 92 are mounted may be pointing toward the ground. In this case, sensor 84 is pointing towards in interior surface of the device and may not be considered or may have a zero weight.

According to some embodiments, a backlight brightness level of a display may be determined according to, or by considering 1) ambient light sensor data; 2) the percentage of overall control or weight the ambient light sensor data has on the brightness; and 3) a user requested system backlight level. In addition, the electronic device settings or mode may also have an affect on the brightness of the backlight level.

According to embodiments, the display control parameter depends on (e.g., is controlled by, is related to, considers, or is according) to both the ALS weight and the ALS value (e.g., a multiple of the weight and value). The display control parameter may or may not be offset or depend on (e.g., be weighted by) a constant.

FIG. 9A is a graph showing examples of ambient light sensor (ALS) weight ranges versus user selected brightness range according to a linear relationship. For instance, in some embodiments, the ALS value is only allowed to control a maximum percent of the display control parameter (e.g., of a physical brightness and/or contrast level). This may be an instance where it is desired to not let the display control parameter drop below 75%. This example can be represented by line 910 of FIG. 9A. Line 910 shows that where the user selects a brightness of 1.0 or 100%, the ALS weight is not a factor in the display control parameter, but as the user selected brightness decreases, the weight increases up to having a 25% affect on altering the display control parameter. For instance, a display control parameter resulting from implementing line 910 may be generalized as equation (a):

(a) display control parameter=$K$+(ALS weight×ALS value)

Here, the display control parameter is constant K plus (ALS weight times ALS value). Some cases consider that the ALS output weight may be inversely related to a range of the user selected brightness level increase. Moreover, this relationship may be proportional or linear (e.g., wherein a range of the ambient light sensor output weight is linearly inversely proportional to a range of the user selected brightness level).

Also, the ALS weight and user brightness may be each normalized (e.g., providing an user brightness value and an ALS weight in a range between 0 and 1.0). These normalized values may be based on a received user setting, input or selected brightness level, such as shown for FIG. 9A. For instance, in the example above, according to equation (a), the constant K is 75%, the maximum ALS weight is 25%. Thus, depending on the ALS value, the display control parameter will change between 75% and 100%, increasing linearly as the ALS value increases. For example, in the brightest sunlight where the ALS value is 1.0, the parameter will be 100% (e.g., in an ambient light environment of bright sunlight). Alternatively, in an ambient light environment within a dark room (e.g., a softly lit room) where the ALS value is 0.2, the parameter will be 80%. Thus, the ALS weight may be described as an affect, scaling, factor, control or adjustment of the light sensor value on the display control parameter. Notably, the display control parameter may be a physical brightness level of a backlight of a display, and the user setting may be a requested physical brightness level of the backlight.

Although line 910 is shown decreasing from the maximum weight percent to zero, it is considered that the line may have a greater negative slope or be shifted down. For instance, although the weight value has a maximum along the graph axis, the minimum may be at a percent of user selected brightness less than 100%, and the line may have the same slope as shown (thus the maximum weight value is less than shown for that line) or may have a more negative slope (for the same maximum weight value). Line 910 is shown as a straight line, but it can be appreciated that a curved or less than linear relationship can be used in place of 910, where the weight is inversely related to the user selected brightness level, but not in a linear relationship.

Also, in some cases, the display parameter or physical brightness level is multiplied by a system requested backlight level, such as a level requested by the device, processor, or application due to factors other than the user setting, ALS level, and ALS weight. For example, the system requested level may be a device setting for the display of a fully bright level (e.g., 100% brightness device setting), a dimmed display level (e.g., 10% of brightness for the display setting), or an off display level (e.g., 0% brightness device setting) requested or selected by the device, processor, or application due to an output of a different sensor. Specifically, a proximity sensor and/or light sensors may indicate that the device is closed, off, not being used, in a pocket, or next to a person's face or ear. Thus, the off display level may be selected. Alternatively, the device may have been idle or not used for a period of time after which the dimmed display is selected. By multiplying the parameter of equation (a) by the 10% dimmed level, the dimming would now be an 8% backlight level. Alternatively, at the 100% level, the parameter of equation (a) would be the brightness level, and at an off display level, there would be 0% brightness regardless of equation (a).

According to embodiments, a system requested level or device setting affecting the backlight brightness or a display parameter may be related to a type of application executing on the device and/or being displaying on the display device. For example, a type of application (and respective brightness) may include primarily textual content display (low), primarily image or picture content display (high), primarily video content display (high), primarily color content display (normal/middle), and/or primarily black and white content display (low). A combination of these types is also considered, such as where the respective brightness may be an aggregate depending on the types included (e.g., black and white text uses a lower brightness than images, video, or a color display).

Further refinements include considering adjusting how much maximum control the ALS value can have on brightness. For example, line 920 shows an instance where the maximum amount of control is 15%. Thus, the ALS can adjust the brightness between 85% and 100%. Other than the 15% control change, the description above with respect to line 910 applies to line 920 and a control parameter, brightness, user setting, ALS value and ALS weight apply.

Thus, if the device receives a higher overall backlight level input or request from the user, the amount of control the ALS has on the final backlight level is decreased. Alternatively, if the device receives a lower level setting or request from the user, the ALS level is given more control to provide the user with a backlight level only high enough to allow the user to see the display image or text, thus conserving battery life. In other words, as shown in FIG. 9A, a change in the user setting or selected brightness causes a change in the ALS weight, which alters an affect of the ALS value on controlling (e.g., altering, changing or adjusting) the display control parameter or brightness. Consequently, the application or processor may cause the display device to display the physical brightness level of the backlight according to or based on the display control parameter or as described above. Specifically, the backlight physical brightness will be based on the user selected brightness level, the ambient light sensor weight, and the ambient light sensor value, where a change in the user selected brightness level causes a change in the ambient light sensor output weight. Thus, the brightness level may be altered based on a change in the weight, in the ambient light sensor output level, in the user selected brightness level, and/or in a device setting for the display.

According to some embodiments, the relationship between the ALS weight and the user selected brightness may not be linear, such as for a relationship that has a higher weight between the ends of the user selectable range. For example, FIG. 9B shows an example of an ALS weight range versus user selected brightness range according to a "bell" shaped curve relationship. FIG. 9B shows "bell" shaped curve 930, which may be a Gaussian shaped curve, representing the altering of the ALS weight caused by changes in the user selected brightness level. In FIG. 9B the user selected brightness range includes low end 940, middle portion 950, and high end 960. Also, ALS weight range goes from 10% to 50%, as compared to where the ALS weight range in FIG. 9A, for line 910, only goes to 25%. It can be appreciated that FIG. 9B gradually assigns less weight as the selected brightness moves in either direction away from center 50% brightness or middle portion 950. It can also be appreciated that while curve 930 shows a specific shape, the values selected for the low end, middle portion, and high end may be altered, as long as the middle portion ALS weight is greater than that at the low end and high end. For example, the values at the low end, middle portion, and high end could all be increased or decreased, or increased and decreased with respect to each other. For example, the curve may be simply shifted up or down, or the ends of the curve may be increased or decreased while the middle portion stays the same, and/or the middle portion may be increased or decreased. For example, a less or more pronounced curve may be implanted. In addition, although curve 930 has a peak at the 50% user brightness, it can be appreciated that the curve can be shifted to the left or right with respect to user brightness.

According to embodiments, the backlight brightness of a display depends on, is controlled by, is related to, considers, or is according to the user selected brightness, ALS weight and the ALS value (e.g., a multiple of the weight and value, plus the user selected brightness). The brightness may or may not depend on the user selected brightness times (1−ALS weight), where the weight is normalized.

The physical brightness level resulting from implementing curve 930 may be generalized by normalizing the ALS value (e.g., providing an ALS visible light value in a range between 0 and 1.0, such as described above for implementing equation (a)) as equation (b):

(b) brightness=(ALS value×ALS weight)+(user brightness×(1×ALS weight))

where the ALS weight and user brightness (e.g., user selected brightness) are also normalized (e.g., providing an user brightness value and an ALS weight in a range between 0 and 1.0, based on a received user setting, input or selected brightness level, such as shown in FIG. 9B). The result is the ALS value has less of an affect on brightness as the ALS weight diminishes, at the low end and high end of the user selected brightness, as compared to the middle portion.

FIG. 9C shows examples of device physical brightness level ranges versus ALS output level range for a "bell" shaped curve relationship between ALS weight and user selected brightness. Specifically, for the example, of curve 930, FIG. 9C shows line 970 representing a user selected brightness of 1.0, such as near high end 960 of FIG. 9B. FIG. 9C also shows line 980 representing device brightness for the user selected brightness of 0.5 or half of the maximum. Also, FIG. 9C shows line 990 representing a user selected brightness of 0.1 or 10% of the maximum brightness. It can be appreciated that line 970 has the greatest device brightness as the user has selected the maximum brightness and varies only by 10% corresponding to the 10% ALS weight of FIG. 9B at high end 960. Similarly, line 990 has the lowest device brightness as the user has selected the minimum brightness, and varies by only 10% according to the ALS weight at low end 940 of FIG. 9B. However, for line 980, the device brightness is between line 970 and 990, but has a wide range of 50% change in device brightness with ALS levels as indicated by the ALS weight at the 0.5 user brightness in FIG. 9B. In the case shown in FIGS. 9B and 9C, when the user selects a very dim brightness, the change due to ALS levels is minimal, which may provide the advantage of allowing the user to extend the battery life by selecting a low brightness. Alternatively, for the highest user selected brightness, the change in device brightness effect by the ALS level may also be minimal to provide the user the advantage of being able to keep the backlight bright in order to have the maximum opportunity to view the content on the displayed device. Alternatively, allowing a greater change in the affect or weight of the ALS value on the device brightness between the ends of the user selected brightness, may allow the advantage of providing extended battery by letting the device, processor, or software minimize the brightness of the display backlight to only overcome the ambient light environment.

The use of the term "range" may represent a range of values, weights, or evels described herein. In some cases, the relationship between an ALS weight range and an ALS level range (or value range) may be a proportional, linear, inverse, "bell" shaped curve, and/or Gaussian shaped curved relationship between the weights and values (or levels) (e.g., see FIGS. 9A-9C).

Additional information about proximity sensors can be found in U.S. patent application Ser. No. 11/241,839, titled "PROXIMITY DETECTOR IN HANDHELD DEVICE," and U.S. patent application Ser. No. 11/240,788, titled "PROXIMITY DETECTOR IN HANDHELD DEVICE;" U.S. patent application Ser. No. 11/165,958, titled "METHODS AND APPARATUS FOR REMOTELY DETECTING PRESENCE," filed Jun. 23, 2005; and U.S. Pat. No. 6,583,676, titled "PROXIMITY/TOUCH DETECTOR AND CALIBRATION CIRCUIT," issued Jun. 24, 2003; and U.S. patent application Ser. No. 11/600,344, filed Nov. 15, 2006 titled "INTEGRATED PROXIMITY SENSOR AND LIGHT SENSOR" which are all incorporated herein by reference in their entireties.

Moreover, according to embodiments, the ALS value or intensity may represent the value or intensity for a plurality of ALS sensors. For example, the device, processor, or software application may receive a number of ambient light sensor output levels from a number of sensors. As noted above, the number of outputs may be weighted depending on or based on the location of each sensor on the device. For example, an ALS sensor on the face of the device pointing at the user may be given a higher weight as it may best represent light falling directly on the display or a cover of the display. Alternatively, sensors facing the ground may be given lower weights, as they face away from light incident upon the display. The multiple sensor outputs are then each multiplied by their weighting factor (e.g., scaled) and added together to represent a total ambient light falling on the entire device. That total ambient light is then normalized to come up with a number from 0 to 1, with 1 representing full sunlight and 0 representing total darkness (e.g., and a lighted room between 1 and 0, with a brightly lit room above a softly or darkly lit room). Thus, it is contemplated that the descriptions above with respect to an ALS light value apply to the normalized value for multiple ALS sensors, as described herein, such as where the ALS output level or value (e.g., for ambient visible light) is set to an aggregate of the weighted ALS outputs.

Also, according to some embodiments, a display contrast output level (e.g., display control parameters) can be (automatically in some cases) altered according to a change or alteration (automatically or not) of a display brightness output level and/or an ALS output level. For example, the contrast level may be an output level to a display and may be based on the display brightness output level as well as on an ALS output level. Thus, in some cases, a change in either or both of the display brightness level and the ALS output level causes a corresponding or related change in the contrast output level. It can be appreciated that the contrast output level and brightness output level are both output to the same display, such as being components of a backlight of a display. Moreover, in some cases, an increase in the display brightness output level may automatically cause a decrease in the display contrast output level, such as according to a linear or non-linear inverse relationship. Also, an increase in the sensor output level may automatically cause an increase in the display contrast output level, such as according to a linear or non-linear relationship. Thus, if the sensor output level stays the same, and the brightness level increases, the contrast level will decrease. Alternatively, if the brightness level stays the same and the output level increases, the contrast level may increase. It can also be appreciated that if the brightness level increases and the sensor output level increases, to cause an equal alteration or change in the contrast level, the result is no change in the contrast level, as the increase and decrease will counteract each other. Finally, it can be appreciated that descriptions above with respect to the display brightness output level and ALS output level being received by a device, processor, or software apply to the discussion with respect to the contrast output level embodiment. Similarly, the discussions herein with respect to a machine accessible medium, and instructions executed on a machine or processor apply to the contrast output level embodiment above. Also, the display output level (e.g., change), ALS output level (e.g., change), and/or display contrast output level (e.g., change) may be stored in a memory or storage device. Finally, it can be appreciated that the prior discussions with respect to a brightness level (and display parameter), and ALS level or value apply to the display brightness output level and ambient light sensor output level described above for the contrast output level embodiment.

According to embodiments, the concepts above for receiving a user setting of a display control parameter, and altering, (automatically in some cases) based on the user setting, an effect of an ALS on control of the display control parameter apply to portable and non-portable devices. Thus, in some case, a parameter of a backlight for a portable device (such as a cell phone, MP-3 player, or lap-top computer) may be altered depending on an ambient light setting that the device is moved into (e.g., from indoor to outdoor light, and vice versa). Alternatively, in some cases, a parameter of a backlight for a non-portable device (such as a desktop computer) may be altered depending on an ambient light setting that changes at the device e.g., by turning on, turning off, or adjusting (such as using a dimmer switch) a level of indoor lighting in the room the device is in).

According to some embodiments, the ALS output value received from one or more sensors may be used to operate a proximity sensor of an electronic device by (automatically in some cases) setting, altering or changing an on/off setting or status of a proximity sensor. The setting or changing may be to set or alter a setting of a proximity sensor to power up, turn on, power down, turn off, such according to an output level or change in level of an ALS. In some cases, when a change to a light sensor output level (e.g., a change in ambient light level) that exceeds a threshold limit, the proximity sensor powers up, turns on, powers down, or turns off. The change in the output level can be a rate of change of an ambient light level and an amount of change of an ambient light level that exceeds a threshold. For example, the change may be a rapid (e.g., over a short period of time) or drastic (e.g., over a wide range of levels) change in the visible light or IR light as determined by one or more ALS sensors, as described herein. For multiple sensors, the sensor outputs may be multiplied or weighted as described herein. Moreover, the ALS sensor output may be compared to a rate of change or amount of change threshold to cause the proximity sensor to power up.

Thus, the ALS sensor output may be received by an electronic device, processor, or software application as described herein which causes powering up or turning on of the proximity sensor in response to the ALS level exceeding the threshold. It can be appreciated that this process allows for conservation or reduction of use of power or battery energy consumed by the proximity sensor (e.g., such as by the IR emitter, sensor, and processing logic).

Also, in some cases, the ALS sensor output may be used in connection with other sensor outputs, such as accelerometer output, a "lock" button (e.g., to hold a setting of a device), and "on" button to turn on an electronic device. The concepts described above with respect to turning on a proximity sensor apply here as well, such as to conserver or reduce power or battery consumption by only turning on the device if, in addition to another sensor output, a threshold is exceeded by the ALS sensor output. It can be appreciated that this reduces occurrences or possibilities of an inadvertent "bump", "lock" button, "on" button pressure from turning on the device and consuming battery power when not intended by the user.

Figure 10:
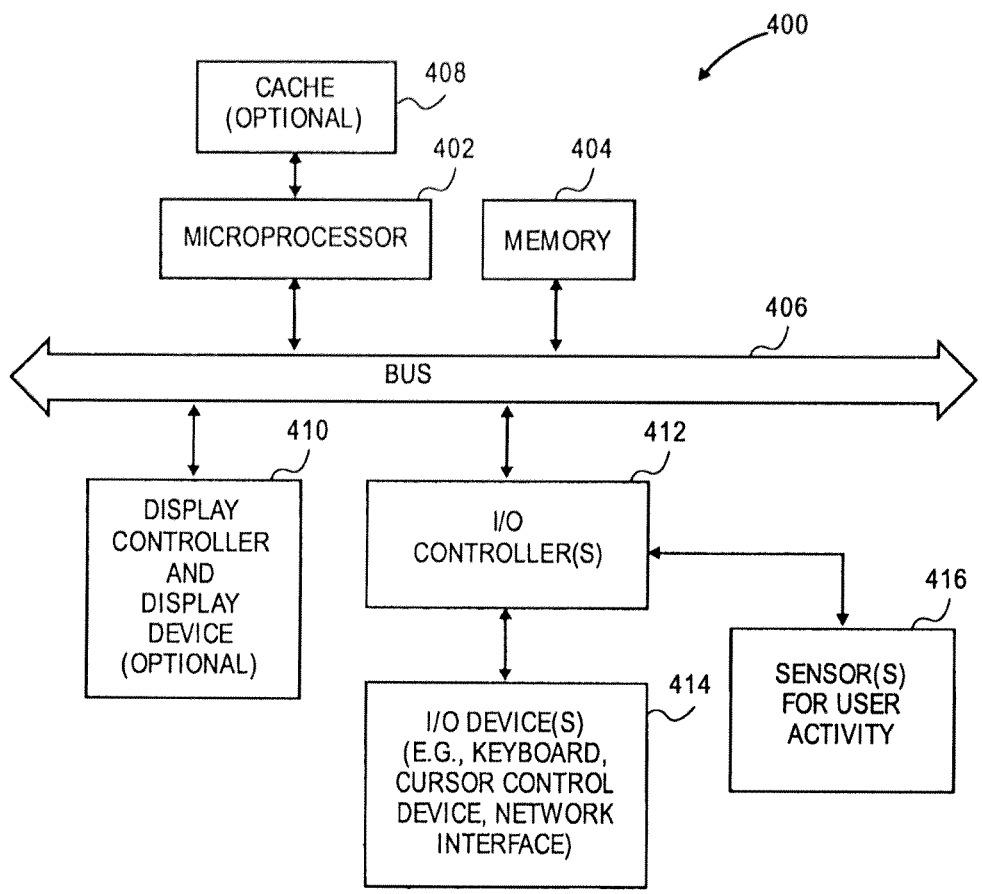
FIG. 10 is a block diagram of a digital processing system in accordance with one embodiment of the present invention.

FIG. 10 shows another example of a device according to an embodiment of the inventions. This device may include a processor, such as microprocessor 402, and a memory 404 (e.g., a storage device), which are coupled to each other through a bus 406. The device 400 may optionally include a cache 408 which is coupled to the microprocessor 402. This device may also optionally include a display controller and display device 410 which is coupled to the other components through the bus 406. One or more input/output controllers 412 are also coupled to the bus 406 to provide an interface for input/output devices 414 (e.g., user interface controls or input devices) and to provide an interface for one or more sensors 416 which are for sensing user activity. The bus 406 may include one or more buses connected to each other through various bridges, controllers, and/or adapters as is well known in the art. The input/output devices 414 may include a keypad or keyboard or a cursor control device such as a touch input panel. Furthermore, the input/output devices 414 may include a network interface which is either for a wired network or a wireless network (e.g. an RF transceiver). The sensors 416 may be any one of the sensors described herein including, for example, a proximity sensor or an ambient light sensor. In at least certain implementations of the device 400, the microprocessor 402 may receive data from one or more sensors 416 and may perform the analysis of that data in the manner described herein. For example, the data may be analyzed through artificial intelligence process or in the other ways described herein. As a result of that analysis, the microprocessor 402 may then (automatically in some cases) cause an adjustment in one or more settings of the device.

According to embodiments, a "user setting" may be a brightness or contrast level, setting, or selection received (e.g., requested) from the user by a device, processor, or software application. As such, the user setting may describe data relating to touches received by a touch input panel, data received from an input device, and/or data received from a user interface of an electronic device. In some cases the user setting may be a user selected brightness level, such as to select a brightness level in a range of user brightness level settings.

Also, according to embodiments, the output of the light sensor may be a value or level of ambient light (e.g., visible ambient light) sent by the sensor and received by a device, processor, or software application. For example, the light sensor "value" may be an ALS level, or output, such as a reading, electrical signal level or amplitude output by an ALS based on a level or intensity of ambient light received by or incident upon the ALS.

Next, "control" of a display control parameter may describe setting, changing, effecting, determining, altering, or adjusting the parameter or level of the parameter.

Moreover, use of the term "weight", "weighted" or "weighting" herein may describe using a weight value or scalar stored in a memory, logic, processing logic, register, or software to multiply, increase, or decrease the amplitude or intensity of a signal or value (e.g., such as a detected or sensed intensity or amplitude). The weighted value may be described as a value that is scaled, multiplied, driven, increased, amplified, or attenuated by the weight. In some cases, weighting may describe using software to apply a "gain" to an output of a sensor or photodiode.

Also, the term "automatically" may describe a cause and effect relationship, such as where something is altered, changed, or set without receiving a user input or action directed at the altered or changed result. For example, a setting, input or selection received from a user for something other than a display control parameter or brightness level, may also cause an additional change in the parameter or level (e.g., automatically) as a result of altering the other thing. In some cases, "automatically" may describe a result that is a secondary result or in addition to a primary result according to a received user setting or selection. For instance, a setting, input or selection to a display control parameter or brightness level received from a user may not only cause a change in that parameter or level (e.g., according to the user setting, input or selection criteria for the parameter or level), but may also cause an additional change in that parameter or level as a result of altering (e.g., automatically) another weight or value that affects the parameter or level.

According to some embodiments, the concepts described above (e.g., for FIGS. 9A-9C) may be implemented using a machine accessible medium containing instructions (e.g., such as storage device 104, memory 404, or executable program/software instructions stored thereon) that, when executed, cause a machine or processor (e.g., such as digital processing system 103, microprocessor 153, or processor 402) to perform (e.g., automatically or not) one or more actions. The actions may include the receiving, altering, controlling, generating, displaying, relating, processing, processes, and/or other actions, described herein, such as to operate a data processing system, portable device, electronic device, display, display control parameter, backlight control parameter, backlight brightness, or backlight contrast as described herein.

Also, a user setting, selection, selected brightness level or input may describe a change in the setting, selection, level or input, such as one that (automatically in some cases) alters an ALS output weight, display control parameter, or display brightness level according to that change. In this case, setting the weight may or may not include changing a current setting of the weight of the ALS output value. In some cases, such user selection may be a user input to control a user interface feature value, and a weight of an ALS output value that the user interface feature level is based on may be automatically set or adjusted as a result of, depending on, or due to the user input.

Finally, it can be appreciated that the user setting, display control parameter, light sensor value, light sensor output level (e.g., value), user selected brightness level, display brightness level, ALS output weight, ALS output level, device setting and/or system requested level described herein may be stored in a machine accessible medium, such as a memory or data storage device (e.g., device 104, memory 404, system 103, processor 153, processor 402, and the like). In some cases, the stored values, selections, or levels, etc. noted above may be accessed by a device or processor to determine or calculate a display control parameter or brightness level (e.g., displayed by a backlight of a display).

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method of operating a display device of an electronic device, the method comprising:
    altering a brightness level of a display device over a period of time in response to an output from an ambient light sensor (ALS) over the period of time, the amount of the altering being determined by a weight that is applied to the output from the ALS;
    varying the weight in response to a change of a user selected brightness level, wherein the weight is varied according to a relationship between the weight and the user selected brightness level, wherein the output from the ALS is primarily based on light from an external source.

2. The method as in claim 1 wherein the method further comprises receiving the change of the user selected brightness level through a user interface setting and wherein the varying of the weight causes a change in the output from the ALS to have a greater change in the brightness level in one range of the user selected brightness level than in another range of the user selected brightness level.

3. The method of claim 1 wherein the method further comprises:
    controlling a backlight of the display device to change the brightness level.

4. The method of claim 2 wherein the brightness level is determined by the weight, the output from the ALS, and the user selected brightness level.

5. The method of claim 1 wherein the brightness level is proportional to the output from the ALS.

6. The method of claim 1 wherein the relationship has a bell curve shape.

7. The method of claim 1, wherein the output from the ALS is mainly affected by an amount of light produced external to the display.

8. The method of claim 1, wherein the weight is varied to have a different linear increasing slope for different user selected brightness.

9. The method of claim 1, wherein the weighting causes the ALS value to have less of an effect on brightness at a low end and at a high end of a range of the user selected brightness as compared to a middle of the range of the user selected brightness.

10. A machine readable non-transitory medium storing executable program instructions which when executed cause a data processing system to perform a method of operating a display device of an electronic device, the method comprising:
    altering a brightness level of a display device over a period of time in response to an output from an ambient light sensor (ALS) over the period of time, the amount of the altering being determined by a weight that is applied to the output from the ALS;
    varying the weight in response to a change of a user selected brightness level, wherein the weight is varied according to a relationship between the weight and the user selected brightness level, wherein the output from the ALS is primarily based on light from an external source.

11. The medium as in claim 10 wherein the method further comprises receiving the change of the user selected brightness level through a user interface setting and wherein the varying of the weight causes a change in the output from the ALS to have a greater change in the brightness level in one range of the user selected brightness level than in another range of the user selected brightness level.

12. The medium of claim 11 wherein brightness level is determined by the weight, the output from the ALS, and the user selected brightness level.

13. The medium of claim 10 wherein the method further comprises:
    controlling a backlight of the display device to change the brightness level.

14. The medium of claim 10 wherein the brightness level is proportional to the output from the ALS.

15. The medium of claim 10 wherein the relationship has a bell curve shape.

16. The medium of claim 10, wherein the output from the ALS is mainly affected by an amount of light produced external to the display.

17. The medium of claim 10 wherein the weight is varied to have a different linear increasing slope for different user selected brightness.

18. The medium of claim 10, wherein the weighting causes the ALS value to have less of an effect on brightness at a low end and at a high end of a range of the user selected brightness as compared to a middle of the range of the user selected brightness.

19. A data processing system comprising:
one or more processing units to alter a brightness level of a display device over a period of time in response to an output from an ambient light sensor (ALS) over the period of time, the amount of the altering being determined by a weight that is applied to the output from the ALS;
the one or more processing units to vary the weight in response to a change of a user selected brightness level, wherein the weight is varied according to a relationship between the weight and the user selected brightness level, wherein the output from the ALS is primarily based on light from an external source.

20. The system of claim 19 wherein the change of the user selected brightness level is received through a user interface setting and wherein the varying of the weight causes a change in the output from the ALS to have a greater change in the brightness level in one range of the user selected brightness level than in another range of the user selected brightness level.

21. The system of claim 20 wherein the brightness level is determined by the weight, the output from the ALS, and the user selected brightness level.

22. The system of claim 19 wherein the relationship has a Gaussian curve shape.

23. The system of claim 19, wherein the output from the ALS is mainly affected by an amount of light produced external to the display.

24. The system of claim 19, wherein the weight is varied to have a different linear increasing slope for different user selected brightness.

25. The system of claim 19, wherein the weighting causes the ALS value to have less of an effect on brightness at a low end and at a high end of a range of the user selected brightness as compared to a middle of the range of the user selected brightness.

* * * * *